US008673432B2

(12) United States Patent
Yamamura et al.

(10) Patent No.: US 8,673,432 B2
(45) Date of Patent: Mar. 18, 2014

(54) ALIPHATIC POLYESTER SHEET AND MOLDED BODY COMPOSED OF THE SAME

(75) Inventors: Gouhei Yamamura, Shiga (JP); Kazuyoshi Nishikawa, Shiga (JP); Masahiro Kimura, Shiga (JP); Tian Xia, Shanghai (CN); Zheng Xu, Shanghai (CN); Zhengzheng Lai, Shanghai (CN); Jinglu Chen, Shanghai (CN)

(73) Assignee: Toray Industries, Inc. (JP)

( * ) Notice: Subject to any disclaimer, the term of this patent is extended or adjusted under 35 U.S.C. 154(b) by 762 days.

(21) Appl. No.: 12/529,819

(22) PCT Filed: Mar. 12, 2008

(86) PCT No.: PCT/JP2008/054456
§ 371 (c)(1),
(2), (4) Date: Dec. 7, 2009

(87) PCT Pub. No.: WO2008/126581
PCT Pub. Date: Oct. 23, 2008

(65) Prior Publication Data
US 2010/0104882 A1  Apr. 29, 2010

(30) Foreign Application Priority Data

Mar. 16, 2007 (CN) .................... 2007 1 0020278
Aug. 8, 2007 (JP) .................... 2007-206193
Sep. 10, 2007 (JP) .................... 2007-233667

(51) Int. Cl.
B32B 7/00 (2006.01)
B32B 7/02 (2006.01)
B32B 27/06 (2006.01)
B32B 27/18 (2006.01)
B32B 27/36 (2006.01)
C08K 5/053 (2006.01)
C08K 5/16 (2006.01)
C08K 5/20 (2006.01)

(52) U.S. Cl.
USPC .......... 428/212; 428/480; 524/210; 524/211; 524/17; 524/379; 524/386; 524/387; 524/606

(58) Field of Classification Search
None
See application file for complete search history.

(56) References Cited

U.S. PATENT DOCUMENTS

| 5,338,822 | A  | * | 8/1994  | Gruber et al. ............... 528/354 |
| 5,593,778 | A  | * | 1/1997  | Kondo et al. ............... 428/373 |
| 5,686,540 | A  | * | 11/1997 | Kakizawa ................ 525/444 |
| 6,153,276 | A  | * | 11/2000 | Oya et al. ................ 428/35.2 |
| 6,417,294 | B1 | * | 7/2002  | Obuchi et al. ............... 525/450 |
| 7,173,080 | B2 | * | 2/2007  | Yamada et al. ............... 524/445 |
| 7,235,287 | B2 | * | 6/2007  | Egawa .................... 428/212 |
| 7,445,835 | B2 | * | 11/2008 | Serizawa et al. ............ 428/297.4 |
| 7,589,137 | B2 | * | 9/2009  | Sato et al. ................ 524/100 |
| 7,652,085 | B2 | * | 1/2010  | Takenaka et al. ............ 524/317 |
| 7,799,412 | B2 | * | 9/2010  | Yamamura et al. .......... 428/212 |
| 7,999,021 | B2 | * | 8/2011  | Kumazawa et al. .......... 524/112 |
| 8,110,282 | B2 | * | 2/2012  | Osada et al. ................ 428/216 |
| 2002/0002252 | A1 | * | 1/2002 | Obuchi et al. ............... 525/450 |
| 2002/0094444 | A1 | * | 7/2002 | Nakata et al. ............... 428/480 |
| 2005/0165142 | A1 |   | 7/2005 | Nishimura et al. |
| 2006/0100395 | A1 | * | 5/2006 | Aritake .................... 525/450 |
| 2006/0286373 | A1 | * | 12/2006 | Egawa .................... 428/339 |
| 2007/0259195 | A1 | * | 11/2007 | Chou et al. ................ 428/480 |
| 2009/0053489 | A1 |   | 2/2009 | Yamamura et al. |
| 2011/0177311 | A1 | * | 7/2011 | Manabe et al. ............ 428/213 |

FOREIGN PATENT DOCUMENTS

| EP | 1 887 044 A1 | 2/2008 |
| JP | 9-278991 A | 10/1997 |
| JP | 2000-080259 A | 3/2000 |
| JP | 2003-226801 A | 8/2003 |
| JP | 2003-245971 A | 9/2003 |
| JP | 2003-253009 A | 9/2003 |
| JP | 2004-189833 | * 7/2004 |
| JP | 2004-204128 A | 7/2004 |
| JP | 2005-119062 | * 5/2005 |
| JP | 2005-119062 A | 5/2005 |
| JP | 2005-125765 A | 5/2005 |
| WO | WO 2006/121056 A1 | 11/2006 |
| WO | WO 2007-015448 | * 2/2007 |
| WO | WO 2007/026489 A1 | 3/2007 |
| WO | WO 2007 063864 | * 6/2007 |

* cited by examiner

Primary Examiner — Vivian Chen
(74) Attorney, Agent, or Firm — DLA Piper LLP (US)

(57) ABSTRACT

An aliphatic polyester-based sheet including at least Layer A including an aliphatic polyester, wherein $X_A$ of the Layer A is 3-60% and the Layer A contains a crystal nucleating agent and a compound having hydrogen bonding properties with the crystal nucleating agent, and haze of the entire sheet is less than 10%.

9 Claims, No Drawings

ALIPHATIC POLYESTER SHEET AND MOLDED BODY COMPOSED OF THE SAME

RELATED APPLICATIONS

This is a §371 of International Application No. PCT/JP2008/054456, with an international filing date of Mar. 12, 2008 (WO 2008126581 A1, published Oct. 23, 2008), which is based on Chinese Patent Application No. 2007-10020278.5, filed Mar. 16, 2007, and Japanese Patent Application Nos. 2007-206193, filed Aug. 8, 2007, and 2007-233667, filed Sep. 10, 2007.

TECHNICAL FIELD

This disclosures relates to an aliphatic polyester-based sheet having heat resistance, impact resistance, transparency and formability, and to a formed object made thereof.

BACKGROUND

In recent years, under the increase of the environmental consciousness, the soil pollution problems by disposal of plastic products and the global warming issue by increase of carbon dioxide caused by incineration is drawing attention. As a measure for the former, various biodegradable resins, and as a measure for the latter, resins made from plant-derived raw materials which do not give a new load of carbon dioxide to the air even when incinerated, are being actively researched and developed. As to shape-retaining devices such as used for display-wrapping of various products, or as to containers such as food trays or drink cup, those in which various biodegradable resins or plant-derived raw materials are used have been developed. Among them, in particular, polylactic acid which is an aliphatic polyester is most drawing attention since it has a high glass transition temperature and is transparent among the biodegradable or plant-derived plastics and the like, as a material of its future is big.

However, polylactic acid is low in glass transition temperature by approximately 20° C. compared to conventional petroleum-derived raw materials, for example, polyethylene terephthalate, and when it is applied to various conventional uses, there arises a problem that its heat resistance is insufficient.

As means for solving this problem, a technique of crystallizing polylactic acid to improve heat resistance is proposed.

For example, in JP-H9-278991 A, a technique in which a polylactic acid composition containing a transparent nucleating agent is heat treated when it is formed or after the forming, to increase crystallinity is described. In this technique, since heat resistance is imparted by crystallization by heat treatment in a forming mold when it is formed or by a heat treatment after the forming, the heat resistance of sheet itself was insufficient.

In JP 2003-245971 A, a technique in which, by heat treating the sheet before forming or by imparting orientation by drawing, releasability from a heated mold at the forming is imparted is described. However, in this technique, transparencies of the sheet and the formed article were greatly inferior.

In JP 2004-204128 A, a technique of imparting, by mixing a crystalline polylactic acid and an amorphous polylactic acid, a heat formability to a drawn sheet is described. However, in this technique, since the amorphous polylactic acid is contained more than 50%, a sufficient heat resistance can not be imparted.

In JP 2005-119062 A, a polylactic acid-based sheet of which folding endurance is high is proposed, by making into 2 kinds-3 layer sheet constitution of polylactic acid of which inner layer contains polylactic acid and a lactic acid-based polyester and outer layer contains a transparent nucleating agent. However, in the technique disclosed here, there was a problem that transparency becomes poor due to the heat treatment at the time of forming.

In JP 2005-125765 A, a technique in which formability and heat resistance are made compatible by heat crystallizing a laminate sheet comprising 2 layers different in containing amount of D-form of polylactic acid resin, that is, different in crystallinity, but in this technique, transparency was greatly insufficient.

It could thus be helpful to provide, in view of such a background, an aliphatic polyester-based sheet excellent in heat resistance, impact resistance, transparency and formability, and a formed object made thereof.

SUMMARY

We thus provide an aliphatic polyester-based sheet and a formed object made thereof:

(1) An aliphatic polyester-based sheet, wherein it has at least Layer A comprising an aliphatic polyester, a crystallinity $\chi_A$ of the Layer A is 3 to 60%, the Layer A contains a crystal nucleating agent and a compound having hydrogen bonding properties with the crystal nucleating agent, and a haze of the entire sheet is 10% or less.

(2) The aliphatic polyester-based sheet according to the above-mentioned (1), characterized in that Layer A comprising the above-mentioned aliphatic polyester contains, as the crystal nucleating agent, at least one kind selected from the group consisting of an aliphatic carboxylic acid amide and an N-substituted urea and, as the compound having hydrogen bonding properties with the crystal nucleating agent, at least one kind selected from the group consisting of aliphatic alcohols, a sorbitol-based compound, an amino acid, and a polypeptide.

(3) The aliphatic polyester-based sheet according to the above-mentioned (1), characterized in that the above-mentioned aliphatic polyester is polylactic acid.

(4) The aliphatic polyester-based sheet according to the above-mentioned (1), characterized by having at least Layer B comprising the aliphatic polyester of which crystallinity $\chi_B$ satisfies the following equation: $\chi_A > \chi_B$.

(5) The aliphatic polyester-based sheet according to the above-mentioned (3), characterized in that the above-mentioned polylactic acid consists of a mixture of poly-L-lactic acid and poly-D-lactic acid.

(6) The aliphatic polyester-based sheet according to the above-mentioned (4), wherein the aliphatic polyesters of the above-mentioned Layer A and Layer B are polylactic acid, and a containing ratio Da (mol %) of D-lactic acid unit in the poly-L-lactic acid constituting the above-mentioned Layer A and a containing ratio Db (mol %) of D-lactic acid unit in the poly-L-lactic acid constituting the above-mentioned Layer B satisfy the following equation: Da<Db.

(7) The aliphatic polyester-based sheet according to the above-mentioned (1), wherein a stress $F_{100}$ at 100% elongation at 70° C. at least in one direction in sheet surface is 1 to 10 MPa.

(8) The aliphatic polyester-based sheet according to the above-mentioned (5), characterized in that an amount of lactic acid oligomer component contained in the sheet is 0.3 mass % or less.
(9) The aliphatic polyester-based sheet according to the above-mentioned (1), characterized in that a crystal size of the above-mentioned Layer A is 500 nm or less.
(10) The aliphatic polyester-based sheet according to the above-mentioned (4), characterized in that a crystal size of the above-mentioned Layer B is 500 nm or less.
(11) A formed object constituted with the aliphatic polyester-based sheet described in the above-mentioned (1).

The aliphatic polyester-based sheet is excellent in heat resistance, impact resistance, formability and transparency and, in addition, by using the aliphatic polyester-based sheet, a formed object excellent in heat resistance, impact resistance and transparency can be obtained. The aliphatic polyester-based sheet can preferably be used for shape-retaining devices such as various blister packs, food trays which require heat resistance or transparency, containers such as a drink cup, bottles for display of beverage vending machine which require heat resistance, formed object uses such as a can, and industrial materials uses such as a surface material or a laminate material, electrical parts carrying uses such as a carrier tape.

DETAILED DESCRIPTION

We found that an aliphatic polyester-based sheet excellent in heat resistance, impact resistance, transparency and formability and a formed object made thereof includes a crystal nucleating agent and a compound having hydrogen bonding properties with the crystal nucleating agent crystallinity and haze of the entire sheet were controlled in a specified range.

In the aliphatic polyester-based sheet, it is important that at least Layer A comprising an aliphatic polyester is contained, that a crystallinity $\chi_A$ of the Layer A is 3 to 60%, that the Layer A contains a crystal nucleating agent and a compound having hydrogen bonding properties with the crystal nucleating agent and that haze of the entire sheet is 10% or less. When the aliphatic polyester-based sheet has at least the above-mentioned Layer A, it is not especially limited even when it is a mono-layer sheet consisting of Layer A only, or a laminate sheet of 2 layers or 3 layers comprising other layer.

Preferable range of the crystallinity $\chi_A$ of Layer A comprising the aliphatic polyester is 4 to 50% and more preferable range is 5 to 40%. In a case where the crystallinity $\chi_A$ of Layer A of the aliphatic polyester is less than 3%, heat resistance may become insufficient. In a case where the crystallinity $\chi_A$ exceeds 60%, formability may deteriorate.

In the aliphatic polyester-based sheet, it is important that the haze of entire sheet is 10% or less, but it is preferable that the haze of entire sheet is 8% or less. More preferably, the haze of entire sheet is 5% or less, and still more preferably, 3% or less. When the haze of entire sheet exceeds 10%, heat resistance, impact resistance, transparency and formability may deteriorate. The lower limit of the haze of entire sheet is not especially limited and it is more preferable as the haze becomes lower, but since it is difficult to make it less than 0.1% at present, approximately 0.1% is considered as the lower limit, and when it is 0.5% or more and 10% or more, sufficient characteristics are exhibited as the aliphatic polyester-based sheet. The haze mentioned is the converted haze value of a case converted into a sheet of 0.4 mm thickness, and it is the converted haze value obtained by the equation defined by $H_{0.4}$ (%)=H×0.4/d ($H_{0.4}$: haze value (%) converted into 0.4 mm thickness, H: actually measured value (%) of haze of sheet sample, d: thickness (mm) of haze measured portion of sheet sample). It is important that this converted haze value is 10% or less (as mentioned in the above, the haze mentioned, unless there is specific description, means the converted haze value converted by the above-mentioned equation into a case of sheet of 0.4 mm thickness).

It is very important point to make the haze of entire sheet into 10% or more, to exhibit all of heat resistance, impact resistance, formability and transparency which had been problems to be solved, in view points of the following (1) to (4):

(1) Heat resistance: In sheets having a same crystallinity, the lower the haze of entire sheet, the finer crystals have been formed and, in this case, it is possible to crystallize the resin into high density and, in addition, uniformly, and it is very advantageous to improve heat resistance of the sheet.

(2) Impact resistance: In general, plastic is broken when a big force is added, and the force is concentrated to the tip of crack (crack), and when the force is added further, the tip of crack propagates to enlarge the breakage. However, in a case where the haze of entire sheet is suppressed to 10% or more, since the fine crystals are dispersed in the sheet, the crack runs into the fine crystals in the plastic when it propagates, to disperse the propagation of the crack to the surroundings. In this way, since one big crack is changed to several small cracks, the crack is stopped anyway, and as a result, it is advantageous for impact resistance.

(3) Formability: Formability is deteriorated in crystallized sheet, but in a case where the haze of entire sheet is suppressed to 10% or more and the fine crystals are dispersed, amorphous portions necessary for the formation is also dispersed in the sheet, to maintain the formability.

(4) Transparency: When the haze of entire sheet is lowered to 10%, or less transparency is also good.

Thus, the aliphatic polyester-based sheet could, by controlling the crystallinity $\chi_A$ of Layer A comprising the aliphatic polyester into 3 to 60% which is the best range, sufficiently improve heat resistance of the aliphatic polyester-based sheet and, in addition, by making the haze of entire sheet into 10% or more, all of heat resistance, impact resistance, transparency and formability of the aliphatic polyester-based sheet could be made compatible.

It is preferable that the crystal size of the above-mentioned Layer A comprising the aliphatic polyester is 500 nm or less. It is, more preferably, 300 nm or less, still more preferably, 100 nm or less, and further still more preferably, 50 nm or less. When the crystal size of Layer A comprising the aliphatic polyester is 500 nm or less, it is preferable in view point of improving heat resistance, impact resistance, transparency and formability. The lower limit of the crystal size of Layer A comprising the aliphatic polyester, is not especially limited and it becomes more preferable as the crystal size becomes smaller, but since it is difficult to make it less than 5 nm at present, approximately 5 nm is considered as the lower limit.

It is preferable that the aliphatic polyester-based sheet has, in view point of improving formability, at least the above-mentioned Layer A, and Layer B comprising the aliphatic polyester having the crystallinity $\chi_B$ which satisfies $\chi_A > \chi_B$.

It is more preferable that the relation of $\chi_A$ and $\chi_B$ is $\chi_A > 2\chi_B$. More preferably, $\chi_A > 3\chi_B$, and especially preferably, $\chi_A > 5\chi_B$. In case where the relation of $\chi_A$ and $\chi_B$ satisfies $\chi_A > \chi_B$, it is preferable in view point of increasing improving effect of formability.

Preferable range of the crystallinity $\chi_B$ of Layer B comprising the aliphatic polyester is 0 to 30%. To make the crystallinity $\chi_B$ of Layer B comprising the aliphatic polyester into the range of 0 to 30% is preferable in view points of mainly heat resistance and formability. More preferable range is 1 to 25%, and still more preferable range is 2 to 20%.

As to Layer B comprising the aliphatic polyester, it is a preferable embodiment that the Layer B contains the crystal nucleating agent and compound having hydrogen bonding properties with the crystal nucleating agent.

It is preferable that the crystal size of the above-mentioned Layer B comprising the aliphatic polyester is 500 nm or less. It is, more preferably, 300 nm or less, still more preferably, 100 nm or less, and further still more preferably, 50 nm or less. It is preferable that the crystal size of Layer B comprising the aliphatic polyester is 500 nm or less, in view point of improving heat resistance, impact resistance, transparency and formability. The lower limit of the crystal size of the Layer B comprising the aliphatic polyester is not especially limited and it is more preferable as the crystal size becomes smaller, but since it is actually difficult to make the crystal size less than 5 nm at present, approximately 5 nm is considered as the lower limit.

In a case where the aliphatic polyester-based sheet has Layer B, it is preferable that a ratio of Layer B (in a case where Layer B is contained by 2 layers or more, ratio of total of Layer B) with respect to the thickness of entire sheet (total thickness of Layer A and Layer B) is 40 to 98% to make effects of both layers effective. In a case where the ratio of Layer B (in a case where Layer B is contained by 2 layers or more, ratio of total of Layer B) with respect to the thickness of entire sheet (total thickness of Layer A and Layer B) satisfies 40 to 98%, it is preferable in view point that heat resistance and formability becomes easy to be compatible. The ratio of Layer B (in a case where Layer B is contained by 2 layers or more, ratio of total of Layer B) with respect to the thickness of entire sheet (total thickness of Layer A and Layer B) is, more preferably, 50 to 95%, and still more preferably, 60 to 90%.

In a case where the aliphatic polyester-based sheet has Layer B, the laminate constitution may be 2 layers constitution of Layer A and Layer B, or may be 3 layers constitution of Layer A/Layer B/Layer A or Layer B/Layer A/Layer B, or may be a multi-layers constitution more than that, and may contain other layer than Layer A and Layer B. The other layer than Layer A and Layer B may not be limited, in the aliphatic polyester-based sheet, in its position to be arranged such as an inner layer or surface layer, for example, such as the other layer/Layer A/Layer B/Layer A or Layer A/the other layer/Layer B/the other layer/Layer A. In a case where the other layer than Layer A and Layer B are contained, if is preferable that the ratio of Layer A and Layer B with respect to the total thickness in the entire sheet is 40 to 99.9% in the entire sheet. In a case where the other layer is contained, it is preferable to make the ratio of total thickness of Layer A and Layer B to 40 to 99.9% with respect to the entire sheet, mainly in view point of being able to keep heat resistance of the entire sheet. The ratio of the total thickness of Layer A and Layer B is, more preferably, 50 to 99.5% of the entire sheet, and still more preferably, 60 to 99%.

Among these, it is most preferable, in the aliphatic polyester-based sheet, that the aliphatic polyester-based sheet has a laminate structure containing at least 3 layers of Layer A/Layer B/Layer A in which Layer A is arranged on both sides of Layer B. It is because, by Layer A, of which crystallinity is relatively high, being arranged on surface, slipperiness of the sheet with mold when it is heat formed becomes good.

In a case where the laminate structure containing 3 layers of Layer B/Layer A/Layer B in which Layer B is arranged on both sides of Layer A is employed, by arranging Layer B, of which crystallinity is relatively low, on surfaces, there are advantages such that the surface gloss is improved or the surface haze caused by surface roughness is reduced. On the other hand, in view points of slipperiness with a mold, in a case where the aliphatic polyester-based sheet is heat formed, and heat resistance, the laminate structure containing 3 layers of Layer A/Layer B/Layer A is more preferable.

The entire thickness of the aliphatic polyester-based sheet is not especially limited, but to be 50 to 2000 μm is preferable. More preferably, it is 100 to 1500 μm, and still more preferably, 200 to 1000 μm. In a case where the sheet thickness is 50 μm or more, it is preferable in view of preventing a sheet breakage when it is formed and maintaining strength of the formed object. In a case where the sheet thickness is 2000 μm or less, it is preferable in view of preventing aggravations of formability by long time heating when it is formed, and transparency.

The aliphatic polyester is a polycondensate of aliphatic dicarboxylic acid and aliphatic diol, or a polycondensate of aliphatic hydroxycarboxylic acid or the like, but there is especially no limit in monomer structure or in polymerization method.

In concrete, as the aliphatic polyesters, polybutylene sebacate, polybutylene succinate, polybutylene succinate/adipate, polypropylene sebacate, polypropylene succinate, polypropylene succinate/adipate, polylactic acid, polyglycolic acid or the like, can be used. Among these, from an environmental view that it is a plant-derived raw material and in view of performance that its transparency and heat resistance are excellent, it is preferable that polylactic acid is contained as aliphatic polyester. For that reason, in the aliphatic polyester-based sheet, it is preferable that the aliphatic-based polyester of Layer A and/or Layer B is polylactic acid.

It is preferable that a containing amount of the aliphatic polyester of Layer A is 50 to 100 wt % of total weight 100 wt % of Layer A. In a case where the containing amount of the aliphatic polyester of Layer A is 50 to 100 wt % of total weight of Layer A, it is preferable in view point that heat resistance, impact resistance and formability are good. The containing amount of the aliphatic polyester in the total weight of Layer A is, more preferably, 60 to 99.5 wt %, and still more preferably, 80 to 99 wt %. In a case where the aliphatic polyester-based sheet has Layer B, similarly, also as to Layer B, it is preferable that the aliphatic polyester is 50 to 100 wt % in the total weight 100 wt % of Layer B. In a case where the containing amount of the aliphatic polyester in the total weight of Layer B is 50 to 100 wt %, it is preferable in view point that heat resistance, impact resistance and formability are good. The containing amount of the aliphatic polyester in the total weight of Layer B is, more preferably, 60 to 99.5 wt %, and still more preferably, 80 to 99 wt %.

The polylactic acid used as the aliphatic-based polyester constituting Layer A or Layer B is a polymer of which main constituting component is L-lactic acid and/or D-lactic acid unit.

The poly-L-lactic acid mentioned is that of which containing ratio of L-lactic acid unit in the polylactic acid polymer exceeds 50 mol % and 100 mol % or less, and in view of crystallinity, it is preferable that the containing ratio of L-lactic acid unit is 80 mol % or more and 100 mol % or less, and to be 95 mol % or more and 100 mol % or less is more preferable, and to be 98 mol % or more 100 mol % or less is still more preferable.

On the other hand, the poly-D-lactic acid mentioned is that of which containing ratio of D-lactic acid unit in the polylactic acid polymer exceeds 50 mol % and 100 mol % or less, and in view of crystallinity, it is preferable that the containing ratio of D-lactic acid unit is 80 mol % or more and 100 mol % or less, and to be 95 mol % or more and 100 mol % or less is more preferable, and 98 mol % or more and 100 mol % or less is still more preferable.

In the poly-L-lactic acid, depending on the containing ratio of D-lactic acid unit in the poly-L-lactic acid, crystallinity of the resin itself varies. That is, when the containing ratio of D-lactic acid unit in the poly-L-lactic acid increases, crystallinity of the poly-L-lactic acid decreases to approach to amorphous state, and on the contrary, when the containing ratio of D-lactic acid unit in the poly-L-lactic acid decreases, crystallinity of the poly-L-lactic acid increases. In the same way, in poly-D-lactic acid, depending on the containing ratio of L-lactic acid unit in the poly-D-lactic acid, crystallinity of the resin itself varies. That is, when the containing ratio of L-lactic acid unit in the poly-D-lactic acid increases, crystallinity of the poly-D-lactic acid decreases to approach to amorphous state, and on the contrary, when the containing ratio of L-lactic acid unit in the poly-D-lactic acid decreases, crystallinity of the poly-D-lactic acid increases.

The polylactic acid used as the aliphatic polyester constituting Layer A or Layer B may contain other monomer unit than lactic acid. As the monomer, glycol compounds such as ethylene glycol, propylene glycol, butane diol, heptane diol, hexane diol, octane diol, nonane diol, decane diol, 1,4-cyclohexane dimethanol, neopentyl glycol, glycerin, pentaerythritol, bisphenol A, polyethylene glycol, polypropylene glycol and polytetramethylene glycol, dicarboxylic acids such as oxalic acid, adipinic acid, sebacic acid, azelaic acid, dodecanedioic acid, malonic acid, glutaric acid, cyclohexane dicarboxylic acid, terephthalic acid, isophthalic acid, phthalic acid, naphthalene dicarboxylic acid, bis(p-carboxyphenyl)methane, anthracene dicarboxylic acid, 4,4'-diphenyl ether dicarboxylic acid, 5-sodium sulfoisophthalic acid and 5-tetrabutyl phosphonium, isophthalic acid, hydroxycarboxylic acids such as glycolic acid, hydroxypropionic acid, hydroxybutyric acid, hydroxyvaleric acid, hydroxycaproic acid, hydroxybenzoic acid, and lactones such as caprolactone, valerolactone, propiolactone, undecalactone, 1,5-oxepane-2-on, can be mentioned. It is preferable that a copolymerization amount of the above-mentioned other monomer unit is, in a case where the aliphatic polyester constituting Layer A or Layer B is a polylactic acid-based resin, 0 to 30 mol % with respect to the entire monomer unit of the polylactic acid-based resin, and to be 0 to 10 mol % is more preferable.

It is preferable that a weight average molecular weight of the polylactic acid used for the aliphatic polyester constituting Layer A or Layer B is, to satisfy appropriate film-forming ability, drawability and practical mechanical characteristics, 50,000 to 500,000, and more preferably, 100,000 to 250,000. The weight average molecular weight mentioned here is the molecular weight in terms of polymethyl methacrylate measured by gel permeation chromatography (GPC) in chloroform solvent.

It is preferable that the polylactic acid used for the aliphatic polyester constituting Layer A or Layer B is, in view point of being able to suppress the haze of entire sheet low, constituted with a mixture of poly-L-lactic acid and poly-D-lactic acid. When a mixture of poly-L-lactic acid and poly-D-lactic acid is crystallized, a stereo-complex crystal (SC crystal), which is different in crystal system from the crystal (α-crystal) formed from usual L-lactic acid or D-lactic acid only, is formed. By two kinds of crystal systems, α-crystal and SC crystal, being present in a same system, crystal growth of one crystal system is prevented by crystal of the other crystal system, and the crystals can be micro-sized. That is, by this method, it is possible to suppress the haze of entire sheet small. The method of forming respective crystals in an actual sheet is explained later, but α-crystal and SC crystal may be formed simultaneously or, after forming one crystal beforehand, the other crystal may be formed. As a method of forming SC crystal first, a cooling crystallization at spinneret-to-cast portion is preferably employed. This means that SC crystal starts cooling crystallization from a state of relatively high temperature.

In a case where polylactic acid is used as the aliphatic polyester constituting Layer A or Layer B, respective compounding ratios of poly-L-lactic acid and poly-D-lactic acid in respective layers with respect to the entire polylactic acid are not especially limited, but for the above-mentioned purpose, to be 1 to 99% is preferable, to be 5 to 95% is more preferable and to be 10 to 90% is still more preferable. In a case where the respective compounding ratios of poly-L-lactic acid and poly-D-lactic acid in respective layers with respect to the entire polylactic acid satisfy the range of 1 to 99%, it is preferable in view point that the above-mentioned effect of micro-sizing of crystals becomes easy to be developed.

In addition, to form SC crystal more efficiently, it is preferable that a ratio of weight average molecular weight of poly-L-lactic acid (hereafter, referred to as Mw (L)) and weight average molecular weight of poly-D-lactic acid (hereafter, referred to as Mw (D)) in respective layers, Mw (L)/Mw (D) or Mw (D)/Mw (L), is 2 to 40, to be 3 to 20 is more preferable, and to be 4 to 10 is still more preferable. This is because, by making a difference between molecular chain lengths of poly-L-lactic acid and poly-D-lactic acid, their approach with each other becomes easy and SC can be efficiently formed. In a case where the ratios of Mw (L) and Mw (D), Mw (L)/Mw (D) or Mw (D)/Mw (L), in the respective layers are two or more, it is preferable in view point that SC crystal is efficiently formed. And, in a case where the ratios of Mw (L) and Mw (D), Mw (L)/Mw (D) or Mw (D)/Mw (L), in the respective layers are 40 or less, it is preferable in view point that strength of the resin which constitutes the layers can be maintained.

Regarding the aliphatic polyester-based sheet, it is preferable that a relation between the containing ratio, Da (mol %), of D-lactic acid unit with respect to the entire monomer unit in the poly-L-lactic acid which constitutes the above-mentioned Layer A and the containing ratio, Db (mol %), of D-lactic acid unit with respect to the entire monomer unit in the poly-L-lactic acid which constitutes the above-mentioned Layer B, is, Da<Db, in view point that the crystallization effect which is expected to the respectives of Layer A and Layer B becomes easy to be developed. That is, by making Da and Db into the above-mentioned relation of Da<Db, a relation of crystallinities of Layer A and Layer B can be controlled into $\chi_A > \chi_B$, and as a result, it becomes easy to make heat resistance and formability compatible.

Layer A or Layer B at this time is not especially limited if they have poly-L-lactic acid, and it becomes a preferable embodiment even if Layer A or Layer B is constituted with poly-L-lactic acid only or with a mixture of poly-L-lactic acid and poly-D-lactic acid, as far as they satisfy Da<Db (as far as the containing ratio of D-lactic acid unit in poly-L-lactic acid with respect to the entire monomer unit is controlled between Layer A and Layer B). That is, for example, a case where Layer A is a mixture of poly-L-lactic acid and poly-D-lactic acid, Layer B is poly-L-lactic acid and Da<Db is satisfied, and a case where both of Layer A and Layer B are a mixture of poly-L-lactic acid and poly-D-lactic acid and Da<Db is satisfied, or the like are mentioned.

As to the containing ratio of D-lactic acid unit with respect to the entire monomer unit in the poly-L-lactic acid, in Layer A, it is preferable to be in the range of Da=0.2 to 4 mol %. It is more preferably, Da=0.3 to 3 mol %, and still more preferably, Da=0.5 to 2 mol %. As to the containing ratio of D-lactic acid unit with respect to the entire monomer unit in the poly-L-lactic acid, in Layer B, it is preferable that Db=1 to 15 mol %, more preferably, Db=1.2 to 10 mol %, and still more preferably, Db=1.5 to 5 mol %. When two kinds or more poly-L-lactic acid are used in respective layers, an average value, determined by multiplying the containing ratio of D-lactic acid in respective poly-L-lactic acid by the corresponding ratio of poly-L-lactic acid (mass %), is used.

In the aliphatic polyester-based sheet, other resin than the aliphatic polyester may be contained by 0 to 80 mass % in each layer with respect to the total mass of the each layer. As the other resin than the aliphatic polyester, for example, thermoplastic resins such as polyacetal, polyethylene, polypropylene, polyamide, poly(meth)acrylate, polyphenylene sulfide, polyether ether ketone, polyester, polysulfone, polyphenylene oxide, polyimide or polyether imide, thermosetting resins such as phenol resin, melamine resin, polyester resin, silicone resin and epoxy resin, and soft type thermoplastic resins such as ethylene/glycidyl methacrylate copolymer, polyester elastomer, polyamide elastomer, ethylene/propylene terpolymer and ethylene/butene-1 copolymer, are mentioned. Among them, poly(meth)acrylate is preferable in view point that compatibility with aliphatic polyester, especially, with polylactic acid is good and glass transition temperature of the resin composition after mixing is raised such that rigidity at high temperature can be improved. The poly (meth)acrylate is a polymer of which constituting unit is at least one kind monomer selected from acrylate and methacrylate, and two kinds or more monomers may be copolymerized and used. As the acrylate and methacrylate used for constituting the poly(meth)acrylate, for example, acrylates such as methyl acrylate, ethyl acrylate, n-propyl acrylate, n-butyl acrylate, cyanoethyl acrylate and cyanobutyl acrylate, and methacrylates such as methyl methacrylate, ethyl methacrylate, cyclohexyl methacrylate and 2-hydroxyethyl methacrylate, can be used. Among them, to impart a higher rigidity at high temperature and formability to the resin composition, polymethyl methacrylate can preferably be used.

In addition, in view point of imparting impact resistance and improvement of formability, it is preferable that at least one layer selected from Layer A and Layer B contains, as a resin other than the aliphatic polyester, 0.1 to 40 mass % Resin L, of which glass transition temperature is 60° C. or lower, with respect to the total mass of the layer. The containing amount is, more preferably, 0.2 to 30 mass %, and especially preferably, 0.5 to 20 mass %. In a case where the containing amount of Resin L, of which glass transition temperature is 60° C. or lower, is 0.1 mass % or more with respect to the total mass of the layer, it is preferable in view point that the effect of improvement of impact resistance becomes high. In a case of 40 mass % or less, it is preferable in view point that transparency and heat resistance can also be maintained. It is preferable that Resin L is contained in at least Layer B, in view point of imparting impact resistance and improvement of formability.

It is preferable that a weight average molecular weight of Resin L is, mainly from view points of maintaining heat resistance and compatibility with the aliphatic polyester-based resin, 2,000 to 200,000, more preferably, 5,000 to 100,000 and especially preferably, 10,000 to 80,000. The weight average molecular weight mentioned here is the molecular weight in terms of polymethyl methacrylate measured by gel permeation chromatography (GPC) in chloroform solvent.

As Resin L, a block copolymer of polyester or polyalkylene ether with polylactic acid, or a polyester, a rubber or the like are preferably used.

In a case where a polyester is used as Resin L, it is preferable to be contained 0.1 to 10 mass % with respect to the total mass of the layer containing Resin L (polyester). The containing amount is, more preferably, 0.2 to 5 mass %, and especially preferably, 0.5 to 3 mass %.

As polyesters preferably used as Resin L, aromatic and/or aliphatic polyesters such as polybutylene terephthalate, polypropylene terephthalate, polybutylene sebacate, polybutylene succinate, polybutylene succinate/terephthalate, polybutylene adipate/terephthalate, polybutylene succinate/adipate, polypropylene sebacate, polypropylene succinate, polypropylene succinate/terephthalate, polypropylene adipate/terephthalate and polypropylene succinate/adipate, can be preferably used. Among them, especially, polyesters effective for imparting impact resistance are polybutylene adipate/terephthalate and polybutylene succinate/adipate.

In a case where, as Resin L, a block copolymer of a polyester or a polyalkylene ether with a polylactic acid, or a rubber is used, it is preferable to contain 5 to 40 mass % with respect to the total mass of the layer containing Resin L (the block copolymer of a polyester or a polyalkylene ether with a polylactic acid, or the rubber). The containing amount is, more preferably, 7 to 30 mass %, and especially preferably, 10 to 20 mass %.

The block copolymer of a polyester or a polyalkylene ether and a polylactic acid which is Resin L is a block copolymer comprising a polyester segment or a polyalkylene ether segment, and a polylactic acid segment. It is preferable that a containing amount of the lactic acid component in the block copolymer is more than 0 mass % and 60 mass % or less of the block copolymer 100 mass %. In a case where, in the block copolymer, the lactic acid component satisfies the range of more than 0 mass % and 60 mass % or less of the block copolymer 100 mass %, it is preferable in view point that the effect of improving physical properties becomes high. Furthermore, it is preferable that, especially in case where the aliphatic polyester of the layer in which the block copolymer is used is polylactic acid, one or more polylactic acid segment of which molecular weight is 1,500 or more is contained in one molecule of the block copolymer of the aliphatic polyester-based sheet. In this case, by the polylactic acid segment of the block copolymer being taken into the crystal formed by the polylactic acid which is the aliphatic polyester of mother material, a function of connecting the polylactic acid segment of the block copolymer to the mother material is generated, to enable to prevent a bleed out of the block copolymer.

As the polyester segment used for the block copolymer which is Resin L, polybutylene terephthalate, polypropylene terephthalate, polybutylene sebacate, polybutylene succinate, polybutylene succinate/terephthalate, polybutylene adipate/terephthalate, polybutylene adipate/succinate, polypropylene sebacate, polypropylene succinate, polypropylene succinate/terephthalate, polypropylene adipate/terephthalate, polypropylene adipate/succinate or the like can preferably be used.

As the above-mentioned polyalkylene ether segment, polyethylene glycol, polypropylene glycol, polytetramethylene glycol, polyethylene glycol polypropylene glycol copolymer or the like can preferably be used.

In addition, as the above-mentioned rubber which is Resin L, a polymer containing a silicone component, an acryl component, a styrene component, a nitrile component, a conjugate diene component, a urethane component or an ethylene propylene component or the like is preferable, and to be a core-shell type multi-layer polymer is more preferable.

As to the aliphatic polyester-based sheet, it is important that the above-mentioned Layer A contains a crystal nucleating agent. In a case where the aliphatic polyester-based sheet has Layer B further, it is also a preferable embodiment that not only Layer A but also Layer B further have a crystal nucleating agent. The role of such a crystal nucleating agent is to suppress an excessive growth of the crystal of aliphatic polyester, which forms the respective layers, to micro-size the crystal, and to raise the crystallization speed. As the crystal nucleating agent having such a role, an aliphatic carboxylic acid amide, an N-substituted urea, an aliphatic carboxylic acid salt, an aliphatic alcohol, an aliphatic carboxylic acid ester, an aliphatic/aromatic carboxylic acid hydrazide, a sorbitol-based compound, a melamine-based compound, a phenyl phosphoric acid metal salt, an amino acid, a polypeptide or the like can be used. Among them, a compound selected from an aliphatic carboxylic acid amide, a sorbitol-based compound, an amino acid and a polypeptide can preferably be used.

Concrete examples of the aliphatic carboxylic acid amide preferably used as the crystal nucleating agent are aliphatic monocarboxylic acid amides such as lauric acid amide, palmitic acid amide, oleic acid amide, stearic acid amide, erucic acid amide, behenic acid amide, ricinoleic acid amide and hydroxystearic acid amide, N-substituted aliphatic monocarboxylic acid amides such as N-oleyl palmitic acid amide, N-oleyl oleic acid amide, N-oleyl stearic acid amide, N-stearyl oleic acid amide, N-stearyl stearic acid amide, N-stearyl erucic acid amide, methylol stearic acid amide and methylol behenic acid amide, aliphatic carboxylic acid bisamides such as methylene bisstearic acid amide, ethylene bislauric acid amide, ethylene biscapric acid amide, ethylene bisoleic acid amide, ethylene bisstearic acid amide, ethylene biserucic acid amide, ethylene bisbehenic acid amide, ethylene bisisostearic acid amide, ethylene bishydroxystearic acid amide, butylene bisstearic acid amide, hexamethylene bisoleic acid amide, hexamethylene bisstearic acid amide, hexamethylene bisbehenic acid amide, hexamethylene bishydroxystearic acid amide, m-xylylene bisstearic acid amide and m-xylylene bis-12-hydroxystearic acid amide and N-substituted aliphatic carboxylic acid bisamides such as N,N'-dioleyl sebacic acid amide, N,N'-dioleyl adipinic acid amide, N,N'-distearyl adipinic acid amide and N,N'-distearyl sebacic acid amide, are mentioned. Among them, a compound selected from aliphatic monocarboxylic acid amides, N-substituted aliphatic monocarboxylic acid amides and aliphatic carboxylic acid bisamides, is preferably used. An amide of an aliphatic carboxylic acid of, preferably, number of carbons of 4 to 30, more preferably, number of carbons of 12 to 30 and, ammonia or an amine selected from aliphatic/aromatic monoamine/diamines of number of carbons of 1 to 30 is preferably used. In particular, a compound selected from palmitic acid amide, stearic acid amide, erucic acid amide, behenic acid amide, ricinoleic acid amide, hydroxystearic acid amide, N-oleyl palmitic acid amide, N-stearyl erucic acid amide, ethylene biscapric acid amide, ethylene bisoleic acid amide, ethylene bisstearic acid amide, ethylene bislauric acid amide, ethylene biserucic acid amide, m-xylylene bisstearic acid amide and m-xylylene bis-12-hydroxystearic acid amide is preferably used.

As concrete examples of N-substituted urea preferably used as the crystal nucleating agent, N-butyl-N'-stearyl urea, N-propyl-N'-stearyl urea, N-stearyl-N'-stearyl urea, N-phenyl-N'-stearyl urea, xylylene bisstearyl urea, toluoylene bisstearyl urea, hexamethylene bisstearyl urea, diphenyl methane bisstearyl urea, diphenyl methane bislauryl urea or the like can be used.

As preferable examples of the aliphatic carboxylic acid salt preferably used as the crystal nucleating agent, metal salts of aliphatic carboxylic acid, preferably, of number of carbons of 4 to 30, and more preferably, of number of carbons of 14 to 30, are mentioned. As concrete examples of the aliphatic carboxylic acid of number of carbons of 14 to 30, lauric acid, myristic acid, palmitic acid, oleic acid, stearic acid, isostearic acid, behenic acid, montanic acid or the like are mentioned. As examples of the metal, lithium, natrium, kalium, magnesium, calcium, barium, aluminum, zinc, silver, copper, lead, thallium, cobalt, nickel, beryllium or the like are mentioned. In particular, salts of stearic acid or salts of montanic acid are preferably used, and especially, a compound selected from sodium stearate, potassium stearate, zinc stearate and calcium montanate is preferably used.

As preferable example of the aliphatic alcohol preferably used as the crystal nucleating agent, aliphatic alcohols of number of carbons of 4 to 30, and more preferably, of number of carbons of 15 to 30 are mentioned. Concretely, aliphatic monoalcohols such as pentadecyl alcohol, cetyl alcohol, heptadecyl alcohol, stearyl alcohol, nonadecyl alcohol, eicosyl alcohol, ceryl alcohol and myricyl alcohol, aliphatic polyvalent alcohols such as 1,6-hexane diol, 1,7-heptane diol, 1,8-octane diol, 1,9-nonane diol and 1,10-decane diol, and cyclic alcohols such as cyclopentane-1,2-diol, cyclohexane-1,2-diol and cyclohexane-1,4-diol, are mentioned. In particular, aliphatic monoalcohols are preferably used, and especially, stearyl alcohol is preferably used.

As preferable examples of the aliphatic carboxylic acid ester preferably used as the crystal nucleating agent, esters of an aliphatic carboxylic acid of, preferably, number of carbons of 4 to 30, more preferably, number of carbons of 12 to 30 and an alcohol selected from aliphatic/aromatic monool, diol and triol of number of carbons of 1 to 30, are preferably used. As concrete examples, aliphatic monocarboxylic acid esters such as lauric acid cetyl ester, lauric acid phenacyl ester, myristic acid cetyl ester, myristic acid phenacyl ester, palmitic acid isopropyl ester, palmitic acid dodecyl ester, palmitic acid tetradecyl ester, palmitic acid pentadecyl ester, palmitic acid octadecyl ester, palmitic acid cetyl ester, palmitic acid phenyl ester, palmitic acid phenacyl ester, stearic acid cetyl ester and behenic acid ethyl ester, monoesters of ethylene glycol such as monolauric acid glycol, monopalmitic acid glycol and monostearic acid glycol, diesters of ethylene glycol such as dilauric acid glycol, dipalmitic acid glycol and distearic acid glycol, monoesters of glycerin such as monolauric acid glycerin ester, monomyristic acid glycerin ester, monopalmitic acid glycerin ester and monostearic acid glycerin ester, diesters of glycerin such as dilauric acid glycerin ester, dimyristic acid glycerin ester, dipalmitic acid glycerin ester and distearic acid glycerin ester, triesters of glycerin such as trilauric acid glycerin ester, trimyristic acid glycerin ester, tripalmitic acid glycerin ester, tristearic acid glycerin ester, palmito-diolein, palmito-distearin and oleo-distearin, are mentioned. Among them, diesters of ethylene glycol are preferable, and especially, ethylene glycol distearate is preferably used.

As concrete examples of the aliphatic/aromatic carboxylic acid hydrazide preferably used as the crystal nucleating agent, as concrete examples of sebacic acid dibenzoic acid hydrazide and sorbitol-based compound, dibenzylidene sorbitol, bis(p-methyl benzylidene) sorbitol, bis(p-ethyl benzylidene) sorbitol and bis(3,4-dimethyl benzylidene) sorbitol, as concrete examples of melamine-based compound, melamine cyanurate and polybinic acid melamine, as concrete examples of phenyl phosphonic acid metal salt, phenyl phosphonic acid zinc salt, phenyl phosphonic acid calcium salt and phenyl phosphonic acid magnesium salt, or the like can be used.

As concrete examples of amino acid preferably used as the crystal nucleating agent, glycine, alanine, valine, leucine, isoleucine, serine, threonine, cysteine, methionine, phenyl glycine, tolyptophan, proline, o-tyrosine, glutamic acid, aspartic acid, glutamine, asparagine, lysine, arginine, histidine which are elements constituting the protein contained in the living body, and as a concrete example of polypeptide, leuprolide or the like can be used.

These crystal nucleating agents may, in each layer, be used alone, or two kinds or more in combination. When two kinds or more are used, compared to cases in which they are respectively used alone, there are some cases in which a synergistic effect of respective components is developed, to make crystallization speed increase and acceleration of micro-sizing of crystal more significant.

Regarding the total containing amount of these crystal nucleating agents, as to Layer A, it is preferable to be contained 0.1 to 5 mass % with respect to the total mass of Layer A, more preferably, 0.3 to 3 mass %, and still more preferably, 0.5 to 2 mass %. In a case where the total containing amount of the crystal nucleating agent of Layer A is 0.1 mass % or more of the total mass of Layer A, it is preferable in view point that heat resistance and transparency can be developed. And, in a case where the containing amount is 5 mass % or less, it is preferable in view point that it is possible to prevent that the effect as crystal nucleating agent is saturated and appearance or physical characteristics are changed.

As to Layer B, it is preferable to be contained 0.05 to 3 mass % with respect to the total mass of Layer B, more preferably, 0.08 to 2 mass %, and still more preferably, 0.1 to 1.5 mass %. In a case where the total containing amount of the crystal nucleating agent of Layer B is 0.05 mass % or more of the total mass of Layer B, it is preferable in view point that heat resistance and transparency can be developed. And, in a case where the containing amount is 3 mass % or less, it is preferable in view point that formability can be maintained.

In the aliphatic polyester-based sheet, it is important to further contain the above-mentioned compound having hydrogen bonding properties with the crystal nucleating agent. And in a case where the aliphatic polyester-based sheet has Layer B further, it is also a preferable aspect that, not only Layer A, but also Layer B further has the crystal nucleating agent and the compound having hydrogen bonding properties with the crystal nucleating agent. The above-exemplified crystal nucleating agent is self-assembled in many cases, and in such a case, the crystal nucleating agent is added to the resin as aggregated, and a disadvantage may be brought about for micro-sizing the crystal. In such a case, by further mixing the crystal nucleating agent with the compound having hydrogen bonding properties, the self-assembling of the crystal nucleating agent is released, and crystal nucleating agent may be more micro-dispersed. In this case, the micro-sizing of crystal becomes more effective.

There is especially no restriction in this method of adding the compound having hydrogen bonding properties with the crystal nucleating agent. The compound having hydrogen bonding properties with the crystal nucleating agent may be simultaneously melt-mixed or solution-mixed with the aliphatic polyester or the crystal nucleating agent, or may be added to the aliphatic polyester after melt-mixed or solution-mixed with the crystal nucleating agent beforehand. A method in which a master-pellet is prepared and diluted may be employed. Among these, in view of releasing the self-assembly of the crystal nucleating agent, the method in which the compound having hydrogen bonding properties with the crystal nucleating agent is melt-mixed or solution-mixed, with the crystal nucleating agent beforehand is added to the aliphatic polyester is preferable.

A decision whether there is or not the hydrogen bonding properties between the compound and the crystal nucleating agent can be analyzed by NMR. For example, from chemical shift changes of $^1$H-NMR spectrum of solution-mixed product of the compound and the crystal nucleating agent compared to cases of respective single component, it is possible to confirm the presence or absence of hydrogen bond. For example, in a case where an amide compound as the crystal nucleating agent, and a sorbitol-based compound as the compound having hydrogen bonding properties with the crystal nucleating agent are used, it can be confirmed that the hydrogen bond is present between both of them by that, in the solution-mixed product, compared to the respective single components, the proton peak of amide bond shifts to lower magnetic field side and the proton peak of hydroxyl group of sorbitol shifts to higher magnetic field side.

As concrete examples of the compound having hydrogen bonding properties with the crystal nucleating agent, in a case where an aliphatic carboxylic acid amide, N-substituted urea or the like is used as the crystal nucleating agent, aliphatic alcohols, a sorbitol-based compound, an amino acid or a polypeptide or the like can be used. Accordingly, it is especially preferable that, as the crystal nucleating agent, at least one kind selected from the group consisting of an aliphatic carboxylic acid amide and an N-substituted urea is used, and as the compound having hydrogen bonding properties with the crystal nucleating agent, at least one kind selected from the group consisting of aliphatic alcohols, a sorbitol-based compound, an amino acid and a polypeptide, is used.

In a case where the compound having hydrogen bonding properties with the crystal nucleating agent is contained, there is especially no limit of content in relation to the crystal nucleating agent, but from view point of effectively releasing the self-assembly of the crystal nucleating agent, it is preferable that a weight ratio of the crystal nucleating agent and the compound having hydrogen bonding properties with the crystal nucleating agent is 1:9 to 9:1. It is, more preferably, 1:5 to 5:1, and still more preferably, 1:2 to 2:1.

From the view point of releasing the above-mentioned self-assembly of the crystal nucleating agent and micro-dispersing the crystal nucleating agent in the resin, a method in which only the crystal nucleating agent is once dissolved in a solvent to release the self-assembly, and it is added to the resin, can also be used.

In respective layers such as Layer A or Layer B of the aliphatic polyester-based sheet, various particles can be contained. By containing the particle, slipperiness between a mold for forming and the sheet becomes good, it is possible to reduce molding unevenness or sheet breakage, and, releasability from the mold also becomes good. It is preferable that an average particle diameter of the various particles is 0.01 to 10 μm, and as to the containing amounts in respective layers, it is preferable to contain 0.01 to 10 mass % with respect to the total mass of the respective constituting components. The average particle diameter of the various particles is, more preferably, 0.02 to 5 μm, and still more preferably, 0.03 to 2 μm. The containing amounts in the respective layers are, more preferably, 0.02 to 1 mass % with respect to the total mass of the constituting components of the respective layers, and still more preferably, 0.03 to 0.5 mass %. In a case where the average particle diameter is 0.01 μm or more, or in a case where the containing amounts in the respective layers are 0.01 mass % or more of the total mass of the constituting components of the respective layers, it is preferable in view point that an improving effect of slipperiness between the mold for forming and the sheet becomes big. On the other hand, in a case where the average particle diameter is 10 μm or less, or in a case where the containing amount in respective layers is 10 mass % or less with respect to the total mass of the respective layers, it is preferable in view point that transparency of film can be maintained.

The kind of particle is appropriately selected depending on its purpose or use, and it is especially not restricted unless the effect is impaired, but an inorganic particle, an organic particle, a cross-linked polymer particle, an internal particle generated in a polymerization system, or the like can be mentioned. As a matter of course, the respective particles may be used alone, or used as a mixture. In a case where they are used as a mixture, the respective kinds of particle should be used such that the average particle diameter is in the range of 0.01 to 10 μm, and, the total containing amount of all kinds of particle in respective layers is in the range of 0.01 to 10 mass % of the layer.

In the respective layers such as Layer A or Layer B of the aliphatic polyester-based sheet, as far as in a range which does not impair the effect, as needed, an additive, for example, a flame retardant, a heat stabilizer, a light stabilizer, an antioxidant, an anti-coloring agent, a UV absorber, an antistatic agent, a plasticizer, a tackifier, an organic lubricant such as aliphatic acid ester or wax, or a defoamer such as a polysiloxane, a coloring agent such as pigment or dye, or the like can be compounded in an appropriate amount.

For the purpose such as of anti-blocking, anti-static, imparting releasability, improvement of scratch resistance or surface haze reduction by surface smoothing, a functional layer may be provided to the surface of the aliphatic polyester-based sheet. For forming this functional layer, an in-line coating method which is carried out in production process of sheet or an off-line coating which is carried out after winding of the sheet, can be employed.

As concrete methods for forming such a functional layer, wire-bar coating method, doctor blade method, micro-gravure coating method, gravure roll coating method, reverse roll coating method, air knife coating method, rod coating method, die coating method, kiss coating method, reverse kiss coating method, impregnation method, curtain coating method, spray coating method, air doctor coating method or other coating methods than these can be applied alone or in combination.

As examples of the in-line coating method, method of coating a coating liquid on an undrawn sheet, method of coating a coating liquid on an undrawn sheet and biaxially drawing successively or simultaneously, method of coating a coating liquid on a monoaxially drawn sheet and drawing further in the direction perpendicular to the former monoaxially drawing direction, or method of further drawing after the coating liquid is coated on a biaxial drawn sheet, or the like are mentioned.

To improve coatability and adhesive property of coating liquid to the sheet, the aliphatic polyester-based sheet can be subjected to a chemical treatment or to a discharge treatment.

It is preferable that the aliphatic polyester-based sheet has a releasing layer on at least one surface. This is, although explained later, the aliphatic polyester-based sheet may be crystallized by heat treatment in a mold for forming to develop heat resistance, and at that time, to improve releasability between the sheet and the mold.

As a material of such a releasing layer, publicly known materials can be used, and one kind or more selected from a long-chain alkyl acrylate, a silicone resin, a melamine resin, a fluorine resin, a cellulose derivative, a urea resin, a polyolefin resin and a paraffin-based releasing agent or the like, is preferably used.

It is preferable that the sheet has an anti-static layer on at least one surface of the aliphatic polyester-based sheet.

As a material for such an anti-static layer, publicly known materials can be used, but to use an antistatic agent having a quaternary ammonium salt on its main chain is preferable. And, it is possible to impart anti-static property by containing a copolymer containing at least one kind of sulfonic acid, sulfonic acid salt, vinyl imidazolium salt, dianil ammonium chloride, dimethyl ammonium chloride and alkyl ether sulfuric acid ester.

Regarding the aliphatic polyester-based sheet, in view point of preventing a decrease of strength and making heat resistance better, it is preferable that a carboxyl end group concentration of the aliphatic polyester-based resin which constitutes the sheet is 0.1 to 30 equivalent/$10^3$ kg, more preferably, 0.5 to 20 equivalent/$10^3$ kg, and especially preferably, 1 to 10 equivalent/$10^3$ kg. In a case where the carboxyl end group concentration of the aliphatic polyester-based resin is 30 equivalent/$10^3$ kg or less, it is preferable in view point that, when the aliphatic polyester-based sheet or a formed object thereof is used under a condition of a high temperature and a high humidity or under a contact condition with hot water, the decrease of strength by hydrolysis can be prevented. That is, in case it is used for uses such as containers, a generation of the problem that the container becomes brittle and easy to be broken can be prevented.

As methods for making the carboxyl end group concentration into 30 equivalent/$10^3$ kg or less, for example, a method of controlling by catalyst or by thermal history when the aliphatic polyester-based resin is synthesized, a method of reducing thermal history of the aliphatic polyester-based sheet when it is extruded to be formed into a film, and a method in which the carboxyl end is blocked by using a reaction type compound, or the like are mentioned. As the reaction type compound, for example, condensation reaction type compounds such as of aliphatic alcohol or amide compound or addition reaction type compounds such as carbodiimide compound, epoxy compound, oxazoline compound or the like, are mentioned, but the addition reaction type compound is preferable in view point that an extra byproduct is hard to be produced.

Regarding the aliphatic polyester-based sheet, in a case where the aliphatic polyester is polylactic acid, it is preferable that an amount of lactic acid oligomer component contained in the sheet is 0 mass % or more and 0.3 mass % or less. It is, more preferably, 0 mass % or more and 0.25 mass % or less, and still more preferably, 0 mass % or more and 0.2 mass % or less. In a case where the amount of lactic acid oligomer component contained in the sheet is 0.3 mass % or less, it is preferable in view point of being able to prevent that the lactic acid oligomer component remained in the sheet is separated out in powdery state or liquid state and worsens handling property and transparency, and, in view point of being able to prevent hydrolysis of the polylactic acid resin which lowers resistance with the lapse of time of the sheet. The lactic acid oligomer component mentioned here means cyclic dimer (lactide) of lactic acid which is most in amount and representative among lactic acid, linear oligomers and cyclic oligomers of lactic acid, and it is LL-lactide, DD-lactide and DL-(meso)-lactide.

Regarding the aliphatic polyester-based sheet, it is preferable that a stress $F_{100}$ at 100% elongation at 70° C. at least in one direction in sheet surface is 1 to 10 MPa. It is more preferably, 1.5 to 9 MPa, and still more preferably, 2 to 8 MPa. It is preferable in view point that, by making the stress $F_{100}$ at 100% elongation at 70° C. into 10 MPa or less, formability of the sheet becomes better. On the other hand, when the stress $F_{100}$ at 100% elongation at 70° C. is 1 MPa or more, it is preferable in view point that heat resistance of the sheet becomes better.

The aliphatic polyester-based sheet is not especially limited even if it is an undrawn sheet or a drawn sheet, but mainly from view point of resistance with the lapse of time, it may also be a drawn sheet, and in that case, it is preferable to be a biaxially drawn sheet.

Regarding methods to obtain a drawn sheet, it can be done by a conventional drawn sheet producing method such as inflation method, simultaneous biaxial drawing method or successive biaxial drawing method. The successive biaxial drawing method is preferable since it is easy to control orientation condition of the aliphatic polyester-based sheet of which form ability and heat resistance are compatible, and, it is possible to make film forming speed high.

Next, producing method of the aliphatic polyester-based sheet is explained concretely by referring an example in which the aliphatic polyester is polylactic acid.

The polylactic acid can be obtained by the following method. As raw material, a lactic acid component of L-lactic acid and/or D-lactic acid is used, but a hydroxycarboxylic acid other than the lactic acid component can also be used together. A cyclic ester intermediate, for example, lactide, glycolide or the like can also be used as the raw material. Furthermore, dicarboxylic acids or glycols or the like can also be used together.

The polylactic acid can be obtained by a method in which the above-mentioned raw material is directly subjected to a dehydration condensation, or by a method in which the above-mentioned cyclic ester intermediate is subjected to a ring-opening polymerization. For example, in a case where it is directly produced by the dehydration condensation, a high molecular, weight polymer can be obtained by being polymerized by a method in which lactic acids or lactic acids and hydroxycarboxylic acids are, preferably under presence of an organic solvent, preferably a phenyl ether-based solvent, subjected to an azeotropic dehydration condensation, and a solvent, prepared by removing water from the solvent distilled out from the azeotropic distillation to render it substantially anhydrous, is recycled into the reaction system. It is also known that a high molecular weight polymer can be obtained by subjecting a cyclic ester intermediate such as lactide to a ring-opening polymerization under a reduced pressure by using a catalyst such as tin octylate. At this time, by employing a method of controlling removal condition of water and low molecular weight compound when heat-refluxed in the organic solvent, or by a method of preventing depolymerization reaction after completing the polymerization reaction by deactivating the catalyst, or by a method of heat-treating the polymer produced, or the like, a polymer of which amount of lactide is small can be obtained.

Method for making the aliphatic polyester-based sheet into a predetermined crystallinity is not especially restricted, but a cooling crystallization in spinneret-to-cast portion during film formation of the sheet, a heating crystallization during conveyance by hot roll or by tenter, and orientation crystallization by monoaxial or biaxial drawing or a heating crystallization sheet by heating again after film formation (off-line) can be applied. These can be applied alone or two kinds or more may also be applied together.

Here, polylactic acid sheet is explained concretely by referring to an example in which the cooling crystallization in spinneret-to-cast portion and the heating crystallization during conveyance by hot rolls are applied in combination, and by referring an example in which the orientation crystallization by successive biaxial drawing by tenter is carried out.

Poly-L-lactic acid resin and poly-D-lactic acid resin are respectively dried under a reduced pressure of 5 Torr or less at 100 to 120° C. for 3 hours or more, and a resin for A layer and a resin for B layer are supplied to respectively independent separate extruders, and melt-kneaded at 150 to 250° C. depending on their melt-viscosities. Here, to cooling crystallize in spinneret-to-cast portion, the spinneret is cooled to 120 to 200° C. depending on cooling crystallization temperature of the resin. The resins are composited outside or inside the die and extruded from a slit-shaped spinneret of a lip distance of 1 to 3 mm by T die method. The extruded resin is closely contacted with a metallic cooling casting drum by electrically charging using a wire-shaped electrode of diameter 0.5 mm, to obtain an unoriented cast sheet.

The surface temperature of the metallic cooling roll may be set to a temperature near the cooling crystallization temperature of the resin to accelerate the above-mentioned cooling crystallization, but usually, it is preferable to set to the range of 0 to 50° C., more preferable range is 5 to 40° C., and still more preferable range is 10 to 30° C. By setting the surface temperature of the metallic cooling roll to this range, it is possible to prevent a stick of the metal roll and the sheet, and a good transparency can be developed.

By conveying thus obtained unoriented cast sheet on the hot rolls, it is crystallized to a predetermined crystallinity. A preferable temperature rang of the hot rolls of highest temperature is 60 to 160° C., more preferably, 70 to 150° C., and still more preferably, 80 to 140° C. It is preferable that the hot roll surface is a material of silicone or Teflon (trademark) to prevent the stick with the sheet. It is preferable that the final surface temperature of the sheet at this time is 70 to 150° C., and to be 80 to 140° C. is more preferable, and to be 90 to 130° C. is still more preferable. Next, the sheet is conveyed on cooling rolls of 0 to 50° C. to lower the sheet temperature, and an undrawn sheet is obtained.

In a case where a successive biaxial drawing by tenter is carried out, by conveying the unoriented cast sheet obtained in the above-mentioned on hot rolls, it is heated to a temperature at which the longitudinal drawing is carried out. For the heating, an auxiliary means such as an infrared heater may be used together. A preferable range of draw temperature is 70 to 95° C., and more preferably, 75 to 90° C. Thus heated unoriented sheet is drawn in longitudinal direction of the sheet in one step or in a multi-step of two steps or more by using a difference of peripheral speeds between the hot rolls. It is preferable that the total draw ratio is 1.2 to 3.5 times, and more preferably, 1.5 to 3.0 times.

After the sheet thus monoaxial drawn is once cooled, both edge portions of the sheet is held by clips to introduce into a tenter, and a drawing in width direction is carried out. It is preferable that the draw temperature is 70 to 95° C., and more preferably, 75 to 90° C. It is preferable that the draw ratio is 1.2 to 3.5 times, and more preferably, 1.5 to 3.0 times. To decrease a difference of performance of the sheet in width direction, it is preferable to carry out the drawing in width direction at a temperature lower by 1 to 15° C. than the draw temperature of the longitudinal direction. Furthermore, as needed, an additional drawing in longitudinal direction and/or an additional drawing in width direction may be carried out.

Next, this drawn sheet is heat set under tension or while relaxing in width direction. In view point of mainly imparting to the sheet a dimensional stability against heat, and in view point of scattering the lactide contained in the sheet to decrease amount of lactide, a preferable heat treatment temperature is 100 to 160° C., and more preferably, 120 to 150° C. It is preferable that the heat treatment time is in the range of 0.2 to 30 seconds. It is preferable that the relaxation ratio is, in view point of decreasing heat shrinkage in width direction, 1 to 8%, and more preferably, 2 to 5%. It is still more preferable that the sheet is once cooled before carrying out the heat set treatment.

Furthermore, if necessary, the sheet is winded after cooled to room temperature while subjecting to a relaxation treatment in longitudinal and width direction to obtain an aimed aliphatic polyester-based sheet.

Next, as to the formed object constituted with the aliphatic polyester-based sheet, it is explained in the followings.

The formed object includes, film, bag, tube, sheet, cup, bottle, tray, yarn or the like, and there is no limitation in its shape, size, thickness, design or the like. Among them, various industrial materials such as shape-retaining devices including blister pack used for display-wrapping of commercial products, food trays, beverage bottles for display of vending machine, containers including lunch box or drink cup, other various formed objects for wrapping, and surface material can preferably be mentioned.

As the forming method, various forming methods such as vacuum forming, vacuum pressure forming, plug-assist forming, straight forming, free drawing forming, plug-and-ring forming and skeleton forming can be applied.

In view point of improving heat resistance of the formed object further, it is preferable to heat treat when it is formed or after the forming. As that method, a method to crystallize in mold as it is formed (hereafter, referred to as crystallization-in-mold method) or a method to heat treat an amorphous formed object of the sheet can be employed.

In the crystallization-in-mold method, a temperature condition of the mold to be set is, preferably, the temperature range from glass transition temperature (Tg) up to melting point (Tm) of the aliphatic polyester-based sheet, more preferably, from (Tg+5)° C. to (Tm−20)° C., and still more preferably, from (Tg+10)° C. to (Tm−40)° C. In a case where plural glass transition temperatures as aliphatic polyester-based sheet are found, such as in a case where the aliphatic polyester-based sheet is constituted with plural layers different in kind of resin, the lowest value among the glass transition temperatures of the respective layer is used as Tg, and the lowest value among the melting points of respective layer is used as Tm. In a case where the set temperature is higher than Tm, even crystallized in a short time, transparency of the formed object may be impaired or shape may be deformed, and furthermore, it may be melted when heated for a long time. On the contrary, in a temperature lower than Tg, crystallization speed decreases significantly. Retention time of the heat treatment is, although it is different depending on constitution of the aliphatic polyester-based sheet, not especially limited as far as it is a time sufficient to crystallize the formed object or more.

EXAMPLES

This disclosure is explained in more detail in the followings by referring to examples, but is not limited at all by that.

Methods of Measurement and Evaluation

Measurements and Evaluations shown in the examples were carried out by the following conditions.

(1) Crystallinities $\chi_A$ and $\chi_B$

A sheet was cut into an appropriate size, fixed to a sample holder made of aluminum (20 mm×18 mm×0.15 mmt), and subjected to a wide angle X-ray measurement in the following measuring condition.

By using, as an X-ray generator, RU-200R (rotating anode type) (X-ray source: CuKα-ray (curved crystal monochrometer is used) produced by Rigaku Denki Corp., output: 50 kV and 200 mA), as a goniometer, Model 2155D (slit: 1°-0.15 mm-1°-0.45 mm, detector: scintillation counter) produced by Rigaku Denki Corp., and as a count recorder, Model RAD-B produced by Rigaku Denki Corp., a wide angle X-ray measurement was carried out under a measuring condition of [2θ/θ: continuous scan, measuring range: 2θ=5 to 145°, step: 0.02°, scanning speed: 2°/min.], and crystallinity was determined by the Ruland method.

(2) Crystal Size (2a)

A sheet was cut into (α) direction parallel to longitudinal direction and vertical to sheet surface, (β) direction parallel to width direction and vertical to sheet surface and (γ) direction parallel to sheet surface, respectively by ultrathin sectioning to prepare samples, dyed as needed, and the cut surfaces were inspected by using a transmission electron microscope (Model H-7100FA produced by Hitachi, Ltd.) under condition of acceleration voltage of 100 kV, and took photographs at 40,000 times magnification (at this time, in a case where a crystal of which size exceeds 100 nm diameter was not found, or in a case where crystal was not present as an island component, the crystal size was determined by a method explained as (2b) in the following).

The obtained photographs were taken into an image analyzer as images, and by arbitrarily selecting 10 island components (in a case of less than 10, as many as present) and subjecting to an image processing, the size of the island component was determined by the following way.

The maximum length in thickness direction of the sheet (1a) and the maximum length in longitudinal direction of the sheet (1b) of the island component appeared in the cut surface of (α), the maximum length in thickness direction of sheet (1c) and the maximum length in width direction of the sheet (1d) of the island component appeared in the cut surface of (β), and the maximum length in longitudinal direction of the sheet (1e) and the maximum length in width direction of the sheet (1f) of the island component appeared in the cut surface of (γ), were determined. Next, in a case where it is taken that shape index of island component I=(average value of 1b+average value of 1e)/2, shape index of island component J=(average value of 1d+average value of 1f)/2 and shape index K=(average value of 1a+average value of 1c)/2, the crystal size was taken as (I+J+K)/3.

(2b)

A sheet was cut into an appropriate size, fixed to a sample holder made of aluminum (20 mm×18 mm×0.15 mmt), and subjected to a wide angle X-ray measurement in the following measuring condition.

By using, as an X-ray generator, RU-200R (rotating anode type) (X-ray source: CuKα-ray (curved crystal monochrometer is used) produced by Rigaku Denki Corp., output: 50 kV and 200 mA), as a goniometer, Model 2155D (slit: 1°-0.15 mm-1°-0.45 mm, detector: scintillation counter) produced by Rigaku Denki Corp., and as a count recorder, Model RAD-B produced by Rigaku Denki Corp., a wide angle X-ray measurement was carried out under a measuring condition of

[2θ/θ: continuous scan, measuring range: 2θ=5 to 145°, step: 0.02°, scanning speed: 2°/min.], and from a full width at half maximum of the diffraction peak, the crystal size was determined by the Scherrer equation.

(3) Haze

Haze value of sheet was measured by using a turbidity meter (NDH5000 produced by Nippon Denshoku Co., Ltd.). The measurement was carried out 5 times for each run, and from average value of the 5 measurements, the haze value (%) was determined as a value converted into that of a case of sheet of 0.4 mm thickness. The conversion formula is as follows:

$$H_{0.4}(\%) = H \times 0.4/d.$$

Here, $H_{0.4}$: haze value (%) converted into 0.4 mm thickness

H: actually measured value of haze (%) of sheet sample d: sheet sample thickness (mm) of portion where haze was measured.

(4) Stress $F_M$ at 100% Elongation at 70° C. of at Least One Direction in Sheet Surface By using Tensilon UCT-100 equipped with a thermostat bath produced by Orientec Co., Ltd., a stress-strain measurement at 70° C. was carried out. Sample was cut in longitudinal direction of sheet into a rectangle of 200 mm length and 10 mm width, and subjected to a measurement according to the method prescribed in JIS K-7127, to determine a stress $F_{100}$ at 100% elongation in longitudinal direction of sheet at 70° C.

Initial tensile chuck distance was set 20 mm, and tensile speed was set to 300 mm/min. The measurement was repeated 20 times while changing sample, and average value was taken.

(5) Amount of Lactic Acid Oligomer Component (Amount of Lactide)

Sheet was dissolved in methylene chloride and, after adjusted to a concentration of 1 g/20 ml, acetone 60 ml was added, and further, cyclohexane 320 ml was dropped while stirring by ultrasonic wave, to precipitate a component of which main component is polylactic acid-based polymer, and this was separated and filtered to prepare a sample liquid. This sample liquid was analyzed, by using gas chromatograph Model 5890 (produced by Agilent Technologies, detector: FID type), in a condition of column: Model DB-17MS (produced by J&W), column temperature: 50 to 320° C., 25° C./min., and carrier gas: He, to determine an amount of lactide by a calibration curve prepared beforehand by using sample liquids of lactide alone in which concentration was changed.

(6) Layer Thickness Ratio

Photographs of cross-section of sheet was taken by using a metallurgical microscope, Leica DMLM produced by Leica Microsystems Co., at 100 times of magnification and by transmitted light, to determine thickness of respective layers.

As needed, to easily inspect cross-section of the sheet, the determination was carried out after the sheet was heated and crystallized.

(7) Formability

To a vacuum forming machine (Model: Forming 300X produced by Seiko Sangyo Co.) equipped with an aluminum mold (mold temperature 50° C.) like a cap of cup having 95 mm diameter and 7 mm thickness, a cut sheet sample of an aliphatic polyester-based sheet of 210 mm width, 300 mm length and 0.4 mm thickness was set and the sheet was heated to 350° C. for 15 seconds by a ceramic heater and vacuum press-contacted for 10 seconds to the above-mentioned mold to obtain a formed object.

The obtained formed object was visually inspected and evaluated by the following criteria:

○ (good): edge is formed into right angle

Δ (fair): edge portion is slightly round x (poor): quite different from mold shape.

(8) Heat Resistance

By using the formed object obtained by the method (7), deformation when put into an oven set to 60° C. for 2 hours was evaluated by visual inspection:

○ (good): no deformation

Δ (fair): slight deformation x (poor): big deformation.

(9) Impact Resistance

For longitudinal direction and width direction of an aliphatic polyester-based sheet, each 10 rectangle samples of 20 mm×100 mm were prepared, respectively. The 100 mm length of the total 20 pieces of rectangle sample was gradually folded 180° such that the length becomes a half, and depending on sample shape at that time, it was evaluated by the following criteria:

○ (good): all 20 pieces do not break (fractured)

Δ (fair): unbroken samples are more than 1 peace and less than 19 pieces x (poor): all 20 pieces are broken.

(10) Transparency

Haze value of center of circular portion of the formed object obtained by the method (7) was measured 5 times for each run by using a turbidity meter (produced by Nippon Denshoku Co., Ltd. NDH5000), and from the haze value (%) determined, from average value of the 5 measurements, as a value converted into a case of sheet of 0.4 mm thickness, it was decided by the following criteria. The conversion formula is as follows:

$$H_{0.4}(\%) = H \times 0.4/d.$$

Here, $H_{0.4}$: haze value (%) converted into that of 0.4 mm thickness

H: actually measured value (%) of haze of formed sample d: formed sample thickness (mm) of haze measured portion ⊙ (excellent): less than 3%

○ (good): larger than 3% and less than 5%

Δ (fair): larger than 5% and less than 10% x (poor): larger than 10%.

Aliphatic Polyester Resin

Aliphatic polyester resins used in the examples are shown.

P-1:

Poly-L-lactic acid resin of which D-lactic acid containing ratio is 1 mol % and weight average molecular weight in terms of PMMA is 190,000.

P-2:

Poly-L-lactic acid resin of which D-lactic acid containing ratio is 5 mol % and weight average molecular weight in terms of PMMA is 190,000.

P-3:

Poly-L-lactic acid resin of which D-lactic acid containing ratio is 12 mol % and weight average molecular weight in terms of PMMA is 190,000.

P-4:

Mixture of P-1 and P-2 in a mass ratio of 50:50.

P-5:

Mixture of P-1 and P-3 in a mass ratio of 50:50.

P-6:
Mixture of P-1 and poly-D-lactic acid resin of which weight average molecular weight in terms of PMMA is 10,000 (L-lactic acid containing ratio is 1 mol %) in a mass ratio of 90:10.
P-7:
Poly-L-lactic acid resin of which D-lactic acid containing ratio is 1.4 mol % and weight average molecular weight in terms of PMMA is 237,000.
P-8:
Poly-L-lactic acid resin of which D-lactic acid containing ratio is 1.4 mol % and weight average molecular weight in terms of PMMA is 118,000.
P-8:
Poly-L-lactic acid resin of which D-lactic acid containing ratio is 1.4 mol % and weight average molecular weight in terms of PMMA is 98,000.

Crystal Nucleating Agent

Crystal nucleating agents used in the examples are shown.
Q-1:
Ethylene bislauric acid amide (EBLA)
Q-2:
Ethylene bisstearic acid amide (EBSA)
Q-3:
Bis(p-methyl benzylidene) sorbitol
Q-4:
Q-1 (30 g) and Q-3 (30 g) were added in dimethyl sulfoxide (DMSO) 200 mL, and the system was heated to 100° C. and stirred until the solution turned to transparent. After that, DMSO was distilled off under reduced pressure, and the content was further dried by a vacuum drier at 100° C. for 12 hours, to obtain Solution mixture Q-4.
When $^1$H-NMR spectrum Q-4 (DMSO solvent) was inspected, it was found that the peak of proton of amide in Q-1 observed near 3.4 ppm shifted to lower magnetic field by approximately 0.03 ppm with respect to that of the single component, and, it was also found that the proton peak of hydroxyl group in Q-3 observed near 4.5 ppm shifted to higher magnetic field by 0.05 ppm with respect to that of the single component. From this fact, it was found that, in Q-4, a hydrogen bond was formed between the ethylene bislauric acid amide and the bis(p-methyl benzylidene) sorbitol.
Q-5:
Melt-mixture Q-5 was obtained by melt-mixing Q-1 (30 g) and Q-3 (30 g) under nitrogen atmosphere at 300° C. for 5 minutes.
When $^1$H-NMR spectrum (DMSO solvent) of Q-5 was inspected, it was found that the proton peak of amide in Q-1 observed near 3.4 ppm shifted to lower magnetic field by approximately 0.03 ppm with respect to that of the single component, and, the proton peak of the hydroxyl group in Q-3 observed near 4.5 ppm shifted to higher magnetic field by 0.05 ppm with respect to that of the single component. From this fact, it was found that, in Q-5, a hydrogen bond was formed between the ethylene bislauric acid amide and the bis(p-methyl benzylidene) sorbitol.

Preparation of Aliphatic Polyester-Based Sheet

Example 1

Aliphatic polyester resin (P-1) and Solution mixture (Q-4) of ethylene bislauric acid amide and bis(p-methyl benzylidene) sorbitol in a mass ratio of 98:2 were supplied to a vent type twin-screw extruder, extruded from a T die spinneret of which spinneret temperature was set to 200° C., and cooled and solidified by closely contacting by electrostatic charging system to a casting drum of 30° C., to obtain an unoriented cast sheet.
Successively, this unoriented cast sheet was carried on silicone rolls heated to 120° C. such that the contact time would be 10 seconds, and next, carried on cooling rolls of 30° C. to lower the sheet temperature, to obtain an unoriented sheet of 0.40 mm thickness.
The heat resistance, transparency and impact resistance of the obtained sheet were good.

Examples 2 to 6 and Reference Examples 1 to 4

Examples were carried out in the same way as Example 1 except changing the aliphatic polyester resin constituting the sheet and the crystal nucleating agent as shown in Tables 1-1 and 1-2, respectively.

Example 7

Aliphatic polyester resin (P-6) and Solution mixture (Q-4) of ethylene bislauric acid amide and bis(p-methyl benzylidene) sorbitol were supplied to a vent type twin-screw extruder in a mass ratio of 98:2, and after melt-kneaded at 200° C., extruded from a T die spinneret cooled to 180° C., and cooled and solidified by electrostatic charging system by closely contacting to a casting drum of 30° C., to obtain an unoriented cast sheet.
Successively, this unoriented cast sheet was carried on silicone rolls heated to 120° C. such that the contact time would be 10 seconds, and next, carried on cooling rolls of 30° C. to lower the sheet temperature, to obtain an unoriented sheet of 0.40 mm thickness.
The heat resistance, transparency and impact resistance of the obtained sheet were good.

Example 8

As the resin for Layer A, Aliphatic polyester resin (P-1) and Solution mixture (Q-4) of ethylene bislauric acid amide and bis(p-methyl benzylidene) sorbitol in a mass ratio of 98:2, and, as the resin for Layer B, Aliphatic polyester resin (P-2) and Solution mixture (Q-4) of ethylene bislauric acid amide and bis(p-methyl benzylidene) sorbitol in a mass ratio of 98:2, were supplied to separate vent type twin-screw extruders, respectively, and, after melt-kneaded at 200° C., composited such that the layer constitution would be A/B/A, co-extruded from a T die spinneret, and cooled and solidified by electrostatic charging system by closely contacting to a casting drum of 30° C., to obtain an unoriented cast sheet.
Successively, this unoriented cast sheet was carried on silicone rolls heated to 120° C. such that the contact time would be 10 seconds, and next, carried on cooling rolls of 30° C. to lower the sheet temperature, to obtain an unoriented sheet of 0.40 mm thickness.
The formability, heat resistance, transparency and impact resistance of the obtained sheet were good.

Example 9

As the resin for Layer A, Aliphatic polyester resin (P-1) and Solution mixture (Q-4) of ethylene bislauric acid amide and bis(p-methyl benzylidene) sorbitol in a mass ratio of 98:2, and, as the resin for Layer B, Aliphatic polyester resin (P-2) and Solution mixture (Q-4) of ethylene bislauric acid amide and bis(p-methyl benzylidene) sorbitol in a mass ratio of 98:2, were supplied to separate vent type twin-screw extruders, respectively, and after melt-kneaded at 200° C., composited such that the layer constitution would be A/B/A, co-extruded from a T die spinneret, and cooled and solidified by electrostatic charging system by closely contacting to a casting drum of 30° C., to obtain an unoriented cast sheet.

Successively, this unoriented cast sheet was carried on silicone rolls heated to 120° C. such that the contact time would be 30 seconds, and next, carried on cooling rolls of 30° C. to lower the sheet temperature, to obtain an unoriented sheet of 0.40 mm thickness.

The heat resistance and impact resistance of the obtained sheet were good.

Example 10

As the resin for Layer A, Aliphatic polyester resin (P-6) and Solution mixture (Q-4) of ethylene bislauric acid amide and bis(p-methyl benzylidene) sorbitol in a mass ratio of 98:2, and, as the resin for Layer B, Aliphatic polyester resin (P-2) and Solution mixture (Q-4) of ethylene bislauric acid amide and bis(p-methyl benzylidene) sorbitol in a mass ratio of 98:2, were supplied to separate vent type twin-screw extruders, respectively and, after melt-kneaded at 200° C., composited such that the layer constitution would be A/B/A, co-extruded from a T die spinneret cooled to 180° C., and cooled and solidified by electrostatic charging system by closely contacting to a casting drum of 30° C., to obtain an unoriented cast sheet.

Successively, this unoriented cast sheet was carried on silicone rolls heated to 120° C. such that the contact time would be 10 seconds, and next, carried on cooling rolls of 30° C. to lower the sheet temperature, to obtain an unoriented sheet of 0.40 mm thickness.

The formability, heat resistance, transparency and impact resistance of the obtained sheet were good.

Example 11

Aliphatic polyester resin (P-1) and Solution mixture (Q-4) of ethylene bislauric acid amide and bis(p-methyl benzylidene) sorbitol in a mass ratio of 98:2 were supplied to a vent type twin-screw extruder, extruded from a T die spinneret of which spinneret temperature was set to 200° C., and cooled and solidified by electrostatic charging system by closely contacting to a casting drum of 30° C., to obtain an unoriented cast sheet.

Successively, this unoriented cast sheet was carried on silicone rolls heated to 120° C. such that the contact time would be 5 seconds, and next, carried on cooling rolls of 30° C. to lower the sheet temperature, to obtain an unoriented sheet of 0.48 mm thickness. This unoriented sheet was drawn 1.1 times in longitudinal direction by a roll type drawing machine at a temperature of 90° C. After this monoaxially drawn sheet was once cooled on cooling rolls, introduced in a tenter by holding both edges with clips, and drawn 1.1 times in width direction at a temperature of 95° C. Successively, after it was heat treated under constant length at a temperature of 140° C. for 10 seconds, subjected to 1% relaxation treatment in width direction, to obtain a biaxially oriented sheet of 0.4 mm thickness.

The heat resistance, transparency and impact resistance of the obtained sheet were good.

Example 12

This example was carried out in the same way as Example 7, except changing the aliphatic polyester resin constituting the sheet and the crystal nucleating agent to those as shown in Table 1-2, respectively.

Reference Example 5 and Example 13

These examples were carried out in the same way as Example 8, except changing the aliphatic polyester resin constituting the sheet and the crystal nucleating agent to those as shown in Table 1-3, respectively.

Example 14

This example was carried out in the same way as Example 10, except changing the aliphatic polyester resin constituting the sheet and the crystal nucleating agent to those as shown in Table 1-3, respectively.

Reference Example 6

This example was carried out in the same way as Example 11, except changing the aliphatic polyester resin constituting the sheet and the crystal nucleating agent to those as shown in Table 1-3, respectively.

Comparative Example 1

Aliphatic polyester resin (P-1) was supplied to a vent type twin-screw extruder and extruded from a T die spinneret of which spinneret temperature was set to 200° C. and cooled and solidified by electrostatic charging system by closely contacting with a casting drum of 30° C., to obtain an unoriented cast sheet of 0.40 mm thickness.

Crystallinity of the obtained sheet was not within the range of this disclosure, and heat resistance of the sheet was insufficient.

Comparative Example 2

The sheet obtained in Comparative Example 1, was put in a hot air oven set at 120° C. for 10 minutes.

The haze of the entire sheet obtained was not within the range of this disclosure and heat resistance and transparency of the sheet were insufficient.

Comparative Example 3

Aliphatic polyester resin (P-1) and Ethylene bislauric acid amide (Q-1) were supplied to a vent type twin-screw extruder in a mass ratio of 99:1, extruded from a T die spinneret of which spinneret temperature was set to 200° C., and cooled and solidified by electrostatic charging system by closely contacting to a casting drum of 30° C., to obtain an unoriented cast sheet.

Successively, this unoriented cast sheet was carried on silicone rolls heated to 120° C. such that the contact time would be 60 seconds, and next, the sheet temperature was lowered by carrying on cooling rolls of 30° C., to obtain an unoriented sheet of 0.40 mm thickness.

Crystallinity of the obtained sheet and haze of entire sheet were not within the ranges of this disclosure and the sheet formability was insufficient.

Comparative Example 4

Aliphatic polyester resin (P-1) and Ethylene bislauric acid amide (Q-1) were supplied to a vent type twin-screw extruder in a mass ratio of 99:1, extruded from a T die spinneret of which spinneret temperature was set to 200° C., and cooled and solidified by electrostatic charging system by closely contacting to a casting drum of 30° C., to obtain an unoriented cast sheet.

Successively, this unoriented cast sheet was carried on silicone rolls heated to 120° C. such that the contact time would be 40 seconds, and next, the sheet temperature was lowered by carrying on cooling rolls of 30° C., to obtain an unoriented sheet of 0.40 mm thickness.

Haze of entire sheet of the obtained sheet was not within the ranges of this disclosure and the sheet formability was insufficient.

Example 15

Aliphatic polyester resin (P-7) was dried by a vacuum drier at 80° C. for 10 hours. The (P-7) and Ethylene bislauric acid amide (Q-1) were supplied to a vent type twin-screw extruder and melt-mixed at a feed position temperature of 170° C. and an extruding temperature of 210° C., to obtain a master pellet of (P-7)/(Q-1)=95/5 wt %. In the same way, a master pellet of (P-7)/(Q-3)=95/5 wt % was also obtained.

These 2 kind master pellets and (P-7) were dried by a vacuum drier at 80° C. for 10 hours, supplied to a single screw extruder such that (P-7)/(Q-1)/(Q-3)=98/1/1 wt %, melt-mixed at a feed position temperature of 170° C. and extruding temperature of 210° C., extruded from a T die spinneret, and press-contacted to rolls to obtain an unoriented sheet of 0.50 mm thickness.

The obtained sheet was fixed to a metal frame and heat treated at 110° C. for 10 seconds by a tunnel type oven provided with a belt conveyer, to obtain a heat treated sheet.

Example 16

This example was carried out in the same way as Example 15, except changing the heat treatment to that at 110° C. for 20 seconds.

Example 17

This example was carried out in the same way as Example 15, except changing the heat treatment to that at 120° C. for 10 seconds.

Example 18

This example was carried out in the same way as Example 15, except changing the heat treatment to that at 120° C. for 20 seconds.

Example 19

Aliphatic polyester resin (P-7) was dried by a vacuum drier at 80° C. for 10 hours. The (P-7), Ethylene bislauric acid amide (Q-1) and Bis(p-methyl benzylidene) sorbitol (Q-3) were supplied to a vent type twin-screw extruder such that (P-7)/(Q-1)/(Q-3)=100/1/1 weight parts and melt-mixed at a feed position temperature of 170° C. and an extruding temperature of 210° C., to obtain a pellet.

The pellet was dried by a vacuum drier at 80° C. for 10 hours, made into a sheet by a hand press at a pressing temperature of 200° C. for a melting time of 3 minutes and a pressure keeping time of 30 seconds, and cooled by ice water, to obtain a sheet of 0.50 mm thickness.

The obtained sheet was fixed to a metal frame and heat treated at 120° C. for 20 seconds by a tunnel type oven provided with a belt conveyer, to obtain a heat treated sheet.

Example 20

This example was carried out in the same way as Example 19, except making (P-7)/(Q-1)/(Q-3)=100/1/0.5 weight parts and heat treating by a hot air drier at 120° C. for 60 seconds.

Example 21

This example was carried out in the same way as Example 19, except making (P-7)/(Q-1)/(Q-3)=100/0.3/0.1 weight parts and making thickness of the press sheet into 1 mm, and heat treating by a hot air drier at 120° C. for 60 seconds.

Example 22

This example was carried out in the same way as Example 19, except making (P-8)/(Q-1)/(Q-3)=100/1/1 weight parts and making thickness of the press sheet into 0.5 mm, and heat treating by a hot air drier at 120° C. for 60 seconds.

Example 23

This example was carried out in the same way as Example 19, except making (P-9)/(Q-1)/(Q-3)=100/1/1 weight parts and making thickness of the press sheet into 0.5 mm, and heat treating by a hot air drier at 120° C. for 60 seconds.

Results of the above examples are shown in Tables 1-1, 1-2, 1-3, 1-4 and 1-5.

TABLE 1-1

| | | Example 1 | Example 2 | Example 3 | Reference example 1 | Reference example 2 | Example 4 | Example 5 | Example 6 |
|---|---|---|---|---|---|---|---|---|---|
| Layer A | Aliphatic polyester resin (mass %) | P-1 (98) | P-1 (98) | P-1 (98) | P-1 (99) | P-1 (99) | P-1 (99.4) | P-4 (98) | P-5 (98) |
| | Crystal nucleating agent (mass %) | Q-4 (2) | Q-5 (2) | Q-1 (1) Q-3 (1) | Q-1 (1) | Q-2 (1) | Q-4 (0.6) | Q-4 (2) | Q-4 (2) |
| | Crystallinity $\chi_A$ (%) | 22 | 21 | 23 | 20 | 22 | 16 | 13 | 5 |
| | Crystal size (nm) | 19 | 18 | 23 | 35 | 31 | 180 | 45 | 49 |
| Layer B | Aliphatic polyester resin (mass %) | — | — | — | — | — | — | — | — |
| | Crystal nucleating agent (mass %) | — | — | — | — | — | — | — | — |
| | Crystallinity $\chi_B$ (%) | — | — | — | — | — | — | — | — |
| | Crystal size (nm) | — | — | — | — | — | — | — | — |

TABLE 1-1-continued

|  | Example 1 | Example 2 | Example 3 | Reference example 1 | Reference example 2 | Example 4 | Example 5 | Example 6 |
|---|---|---|---|---|---|---|---|---|
| Haze of entire sheet (%) | 2.8 | 2.7 | 3.9 | 5.1 | 5.3 | 8 | 2.6 | 2.3 |
| Layer constitution | — | — | — | — | — | — | — | — |
| Layer thickness ratio | — | — | — | — | — | — | — | — |
| $F_{100}$ (MPa) | 3.1 | 3.3 | 3.4 | 3.8 | 3.5 | 2.9 | 2.8 | 2.1 |
| Amount of lactic acid oligomer component (mass %) | 0.18 | 0.18 | 0.18 | 0.18 | 0.17 | 0.14 | 0.22 | 0.23 |
| Formability | Δ | Δ | Δ | Δ | Δ | ◯ | ◯ | ◯ |
| Heat resistance | ◯ | ◯ | ◯ | ◯ | ◯ | Δ | Δ | Δ |
| Impact resistance | ◯ | ◯ | ◯ | ◯ | ◯ | Δ | ◯ | ◯ |
| Transparency | ◎ | ◎ | ◯ | Δ | Δ | Δ | ◎ | ◎ |

TABLE 1-2

|  |  | Example 7 | Example 8 | Example 9 | Example 10 | Example 11 | Reference example 3 | Reference example 4 | Example 12 |
|---|---|---|---|---|---|---|---|---|---|
| Layer A | Aliphatic polyester resin (mass %) | P-6 (98) | P-1 (98) | P-1 (98) | P-6 (98) | P-1 (98) | P-4 (99) | P-5 (99) | P-6 (98) |
|  | Crystal nucleating agent (mass %) | Q-4 (2) | Q-4 (2) | Q-4 (2) | Q-4 (2) | Q-4 (2) | Q-1 (1) | Q-1 (1) | Q-1 (1) Q-3 (1) |
|  | Crystallinity $\chi_A$ (%) | 27 | 23 | 57 | 29 | 22 | 11 | 3 | 26 |
|  | Crystal size (nm) | 17 | 20 | 370 | 18 | 39 | 59 | 80 | 20 |
| Layer B | Aliphatic polyester resin (mass %) | — | P-2 (98) | P-2 (98) | P-2 (98) | — | — | — | — |
|  | Crystal nucleating agent (mass %) | — | Q-4 (2) | Q-4 (2) | Q-4 (2) | — | — | — | — |
|  | Crystallinity $\chi_B$ (%) | — | 4 | 10 | 4 | — | — | — | — |
|  | Crystal size (nm) | — | 36 | 72 | 31 | — | — | — | — |
| Haze of entire sheet (%) |  | 2.6 | 2.5 | 9.4 | 2.1 | 3.1 | 4.8 | 4.3 | 3.6 |
| Layer constitution |  | — | A/B/A | A/B/A | A/B/A | — | — | — | — |
| Layer thickness ratio |  | — | 1/8/1 | 1/28/1 | 1/8/1 | — | — | — | — |
| $F_{100}$ (MPa) |  | 2.8 | 2.1 | 3.8 | 1.4 | 4.0 | 2.9 | 2.0 | 2.9 |
| Amount of lactic acid oligomer component (mass %) |  | 0.25 | 0.15 | 0.20 | 0.21 | 0.11 | 0.21 | 0.24 | 0.25 |
| Formability |  | Δ | ◯ | Δ | ◯ | Δ | ◯ | ◯ | Δ |
| Heat resistance |  | ◯ | ◯ | ◯ | ◯ | ◯ | Δ | Δ | ◯ |
| Impact resistance |  | ◯ | ◯ | ◯ | ◯ | ◯ | ◯ | ◯ | ◯ |
| Transparency |  | ◎ | ◎ | Δ | ◎ | ◎ | Δ | Δ | ◯ |

TABLE 1-3

|  |  | Reference example 5 | Example 13 | Example 14 | Reference example 6 | Comparative example 1 | Comparative example 2 | Comparative example 3 | Comparative example 4 |
|---|---|---|---|---|---|---|---|---|---|
| Layer A | Aliphatic polyester resin (mass %) | P-1 (99) | P-1 (98) | P-6 (98) | P-1 (99) | P-1 (100) | P-1 (100) | P-1 (99) | P-1 (99) |
|  | Crystal nucleating agent (mass %) | Q-1 (1) | Q-1 (1) Q-3 (1) | Q-1 (1) Q-3 (1) | Q-1 (1) | — | — | Q-1 (1) | Q-1 (1) |
|  | Crystallinity $\chi_A$ (%) | 21 | 23 | 26 | 20 | 2 | 20 | 62 | 55 |
|  | Crystal size (nm) | 36 | 25 | 20 | 35 | 30 | 800 | 410 | 71 |
| Layer B | Aliphatic polyester resin (mass %) | P-2 (99) | P-2 (98) | P-2 (98) | — | — | — | — | — |
|  | Crystal nucleating agent (mass %) | Q-1 (1) | Q-1 (1) Q-3 (1) | Q-1 (1) Q-3 (1) | — | — | — | — | — |
|  | Crystallinity $\chi_B$ (%) | 4 | 4 | 5 | — | — | — | — | — |
|  | Crystal size (nm) | 31 | 28 | 28 | — | — | — | — | — |
| Haze of entire sheet (%) |  | 4.7 | 3.5 | 3.1 | 4.2 | 1.9 | 47 | 22 | 19 |
| Layer constitution |  | A/B/A | A/B/A | A/B/A | — | — | — | — | — |
| Layer thickness ratio |  | 1/8/1 | 1/8/1 | 1/8/1 | — | — | — | — | — |
| $F_{100}$ (MPa) |  | 2.1 | 1.8 | 1.5 | 4.1 | 1.0 | 11.0 | 19.0 | 18.0 |
| Amount of lactic acid oligomer component (mass %) |  | 0.15 | 0.15 | 0.20 | 0.10 | 0.15 | 0.19 | 0.18 | 0.18 |
| Formability |  | ◯ | ◯ | ◯ | Δ | ◯ | Δ | X | X |
| Heat resistance |  | ◯ | ◯ | ◯ | ◯ | X | X | ◯ | ◯ |
| Impact resistance |  | ◯ | ◯ | ◯ | ◯ | ◯ | Δ | Δ | Δ |
| Transparency |  | Δ | ◎ | ◎ | Δ | ◯ | X | X | X |

TABLE 1-4

|  |  | Example 15 | Example 16 | Example 17 | Example 18 |
|---|---|---|---|---|---|
| Layer A | Aliphatic polyester resin (mass %) | P-7 (98) | P-7 (98) | P-7 (98) | P-7 (98) |
|  | Crystal nucleating agent (mass %) | Q-1 (1) | Q-1 (1) | Q-1 (1) | Q-1 (1) |
|  |  | Q-3 (1) | Q-3 (1) | Q-3 (1) | Q-3 (1) |
|  | crystallinity $\chi_A$ (%) | 11 | 20 | 21 | 35 |
|  | Crystal size (nm) | 25 | 31 | 30 | 89 |
| Haze of entire sheet (%) |  | 2 | 4.5 | 3 | 5.2 |
| Impact resistance |  | ○ | ○ | ○ | ○ |

TABLE 1-5

|  |  | Example 19 | Example 20 | Example 21 | Example 22 | Example 23 |
|---|---|---|---|---|---|---|
| Layer A | Aliphatic polyester resin (weight parts) | P-7 (100) | P-7 (100) | P-7 (100) | P-8 (100) | P-9 (100) |
|  | Crystal nucleating agent (weight parts) | Q-1 (1) | Q-1 (1) | Q-1 (0.3) | Q-1 (1) | Q-1 (1) |
|  |  | Q-3 (1) | Q-3 (0.5) | Q-3 (0.1) | Q-3 (1) | Q-3 (1) |
|  | Crystallinity $\chi_A$ (%) | 36 | 37 | 3 | 33 | 29 |
|  | Crystal size (nm) | 98 | 105 | 70 | 51 | 42 |
| Haze of entire sheet (%) |  | 6.1 | 6.2 | 1.3 | 6.6 | 6.4 |
| Impact resistance |  | ○ | ○ | ○ | ○ | ○ |

INDUSTRIAL APPLICABILITY

The aliphatic polyester-based sheet can be applied to a wide use not only to various industrial materials such as shape-retaining devices including blister packs used for display-wrapping of commercial products, food trays, bottles for display of beverage vending machine, containers including lunch box and drink cup, formed object for other various wrappings, and surface material.

To the aliphatic polyester-based sheet, various forming methods can be applied such as vacuum forming, vacuum pressure forming, plug-assist molding, straight forming, free drawing forming, plug-and-ring forming and skeleton forming, and it has a high formability. In particular, it can preferably be used for various shape-retaining devices or wrapping materials for container to which heat resistance, transparency and impact resistance are required.

The invention claimed is:

1. An aliphatic polyester-based sheet comprising at least Layer A comprising an aliphatic polyester, wherein crystallinity $\chi_A$ of said Layer A is 3 to 60% and said Layer A contains a crystal nucleating agent comprising at least one selected from the group consisting of an aliphatic carboxylic acid amide and an N-substituted urea and a compound having hydrogen bonding properties with the crystal nucleating agent comprising at least one selected from the group consisting of sorbitol-based compounds and polypeptides and being melt-mixed or solution-mixed with the crystal nucleating agent before being added to the aliphatic polyester, wherein an amount of lactic acid oligomer component contained in the sheet is less than 0.3 mass % and haze of the entire sheet is 3% or less.

2. The aliphatic polyester-based sheet according to claim 1, wherein said aliphatic polyester is a polylactic acid.

3. The aliphatic polyester-based sheet according to claim 2, wherein said polylactic acid consists of a mixture of poly-L-lactic acid and poly-D-lactic acid.

4. The aliphatic polyester-based sheet according to claim 1, further comprising at least Layer B comprising an aliphatic polyester of which crystallinity $\chi_B$ of Layer B satisfies the following equation:

$$\chi_A > \chi_B.$$

5. The aliphatic polyester-based sheet according to claim 4, wherein the aliphatic polyester of said Layer A and Layer B is polylactic acid, and a containing ratio Da (mol %) of D-lactic acid unit in the poly-L-lactic acid constituting said Layer A and a containing ratio Db (mol %) of D-lactic acid unit in the poly-L-lactic acid constituting said Layer B satisfy the following equation:

$$Da < Db.$$

6. The aliphatic polyester-based sheet according to claim 4, wherein a crystal size of said Layer B is less than 500 nm.

7. The aliphatic polyester-based sheet according to claim 1, wherein a stress $F_{100}$ at 100% elongation at 70° C. at least in one direction in a sheet surface is 1 to 10 MPa.

8. The aliphatic polyester-based sheet according to claim 1, wherein a crystal size of said Layer A is less than 500 nm.

9. A formed object comprising the aliphatic polyester-based sheet according to claim 1.

* * * * *